United States Patent
Iida

(10) Patent No.: US 9,041,969 B2
(45) Date of Patent: May 26, 2015

(54) IMAGE FORMING APPARATUS, METHOD FOR CONTROLLING IMAGE FORMING APPARATUS, AND STORAGE MEDIUM STORING PROGRAM

(71) Applicant: CANON KABUSHIKI KAISHA, Tokyo (JP)

(72) Inventor: Toshihiko Iida, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/448,976

(22) Filed: Jul. 31, 2014

(65) Prior Publication Data

US 2015/0055172 A1 Feb. 26, 2015

(30) Foreign Application Priority Data

Aug. 21, 2013 (JP) ................................. 2013-171705

(51) Int. Cl.
| | |
|---|---|
| *G06F 15/00* | (2006.01) |
| *G06F 3/12* | (2006.01) |
| *G06K 1/00* | (2006.01) |
| *G06K 15/00* | (2006.01) |
| *B65H 7/20* | (2006.01) |
| *H04N 1/00* | (2006.01) |

(52) U.S. Cl.
CPC ............. *G06K 15/4065* (2013.01); *B65H 7/20* (2013.01); *H04N 1/0083* (2013.01); *H04N 2201/0094* (2013.01); *H04N 2201/21* (2013.01)

(58) Field of Classification Search
CPC ............ G06K 15/4065; H04N 1/0083; H04N 2201/0094; H04N 2201/21
USPC ........................ 358/1.1, 1.15, 1.13, 1.14, 1.18
See application file for complete search history.

(56) References Cited

U.S. PATENT DOCUMENTS

| | | | | |
|---|---|---|---|---|
| 8,104,758 | B2* | 1/2012 | Tanaka et al. | 270/58.11 |
| 8,670,703 | B2* | 3/2014 | Mihara | 399/389 |
| 2013/0136462 | A1 | 5/2013 | Iida | |
| 2014/0368879 | A1* | 12/2014 | Kanamoto | 358/1.15 |

FOREIGN PATENT DOCUMENTS

JP 2011-9980 A 1/2011

* cited by examiner

*Primary Examiner* — Douglas Tran
(74) *Attorney, Agent, or Firm* — Fitzpatrick, Cella, Harper & Scinto

(57) ABSTRACT

Sheet information of a sheet contained in each of a first sheet containing unit and a second sheet containing unit is stored in a storing step, the sheet information that is set for the first sheet containing unit and the second sheet containing unit is stored in a memory. It is determined based on the sheet information stored in the memory, whether a sheet to be used in a print job is contained in the first sheet containing unit and the second sheet containing unit. If it is determined not to be contained in the first sheet containing unit and the second sheet containing unit, a change of the sheet information stored in the memory is done. The sheet information stored in the storing step is changed using the changed sheet information in the memory.

10 Claims, 15 Drawing Sheets

FIG. 3A

```
JOB HOLDING

■ HELD JOB LIST                              ~301
  ✓   JOB TITLE      USER NAME   DATE/TIME          [DETAIL/CHANGE]—302
  [1] booklet_device takeshi.b   05/17 16:29        □ UNCHECK ALL         304, 303
      document1      hiroshi.m   04/27 17:01
  [2] text           takeshi.b   04/11 11:13        □ DISPLAY SELECT
      powerpoint     makoto.s    06/12 14:58          USER ONLY      —306
  [3] conference     takeshi.b   05/16 09:41        △ [REPLACEMENT
      map            yuki.n      06/18 09:09        ▽    MODE   ]—305
                                                      [PRINT START]—308
                                                                    —307

■ PRINT JOB LIST
                                    WAITING TIME    —309
  TIME    JOB TITLE        STATUS    (APPROX.)      [DETAIL/
                                                     CHANGE]—310
  10:11 AM test                 printing    1 minute
  10:12 AM confidential_document processing 2 minutes   —312
  10:12 AM media_table          waiting     5 minutes  △ [STOP]—311
  10:13 PM patent               waiting     8 minutes  ▽
                                                      —313
```

FIG. 3B

```
JOB HOLDING

<JOB TICKET EDIT/CHECK> document1

■ GENERAL SETTINGS              ~321
  ┌─────────────────────────────┐  △—322
  │ NUMBER OF COPIES  ▶1        │  ▽—323
  │ FINISHING  ▶SORT (BY COPY)  │
  └─────────────────────────────┘
                   325    324—[ EDIT ]
                        PAPER TYPE/    ONE-SIDED/
  PAGE RANGE  SIZE   PAPER CASSETTE    TWO-SIDED
  ☑ 1   ~5    A4    PLAIN PAPER        TWO-SIDED
  □ 6   ~10   LTR   Paper1             ONE-SIDED   △—326
                                                    ▽—327
328
  □ UNSELECT                    329—[ EDIT ]

[DELETE JOB]—330        331—[ OK ]
```

FIG. 5A

JOB HOLDING
(PAPER INFORMATION REPLACEMENT MODE)

■ HELD JOB LIST ~401

| ✓ | JOB TITLE | USER NAME | DATE/TIME | |
|---|---|---|---|---|
| [1] | booklet_device | takeshi.b | 05/17 16:29 | |
| [1] | text | takeshi.b | 04/11 11:13 | |
| [2] | confernce | takeshi.b | 05/16 09:41 | 🗋 |
| [2] | pamphlet | takeshi.b | 03/18 17:53 | |
| [3] | guide | takeshi.b | 10/29 11:09 | 🗋 |
| [3] | press | takeshi.b | 09/30 9:21 | 🗋 |

DETAIL/CHANGE ~402
☐ SELECT ALL
☐ DISPLAY SELECT USER ONLY
△▽ ~405 ~406
END ~407

■ PAPER SETTINGS ~408

| | PAPER SIZE | NAME |
|---|---|---|
| [1] ☐ | A4 | PLAIN PAPER |
| [2] ☐ | A3 | Paper1 |
| [3] ☐ | A4 | INDEX PAPER |
| [4] ☐ | LTR | PLAIN PAPER |
| [5] ☐ | LTR | THICK PAPER |

412
413

PAPER CHANGE ~409
PAPER DETAIL ~410
UNDO ~411
COLLECTIVELY APPLY ~414

FIG. 5B

JOB HOLDING

■ PAPER SELECTION

● LIST SORT  [REGISTRATION ORDER ▼] ~421

| | NAME | WEIGHT | PAPER SIZE |
|---|---|---|---|
| ☐ | PLAIN PAPER | 80g/m2 | NONE |
| ☐ | THICK PAPER | 120g/m2 | NONE |
| ☐ | INDEX PAPER | 125g/m2 | NONE |
| ☐ | THIN PAPER | 62/m2 | NONE |
| ☐ | COATED PAPER | 150/m2 | NONE |
| ☐ | MAT PAPER | 150/m2 | NONE |
| ☐ | Paper1 | 73/m2 | LTR |
| ☐ | Paper2 | 88/m2 | A4 |
| ☐ | Paper3 | 105/m2 | A3 |

~422
△ ~423
▽ ~424

DETAIL ~425
CANCEL ~426         427~ OK

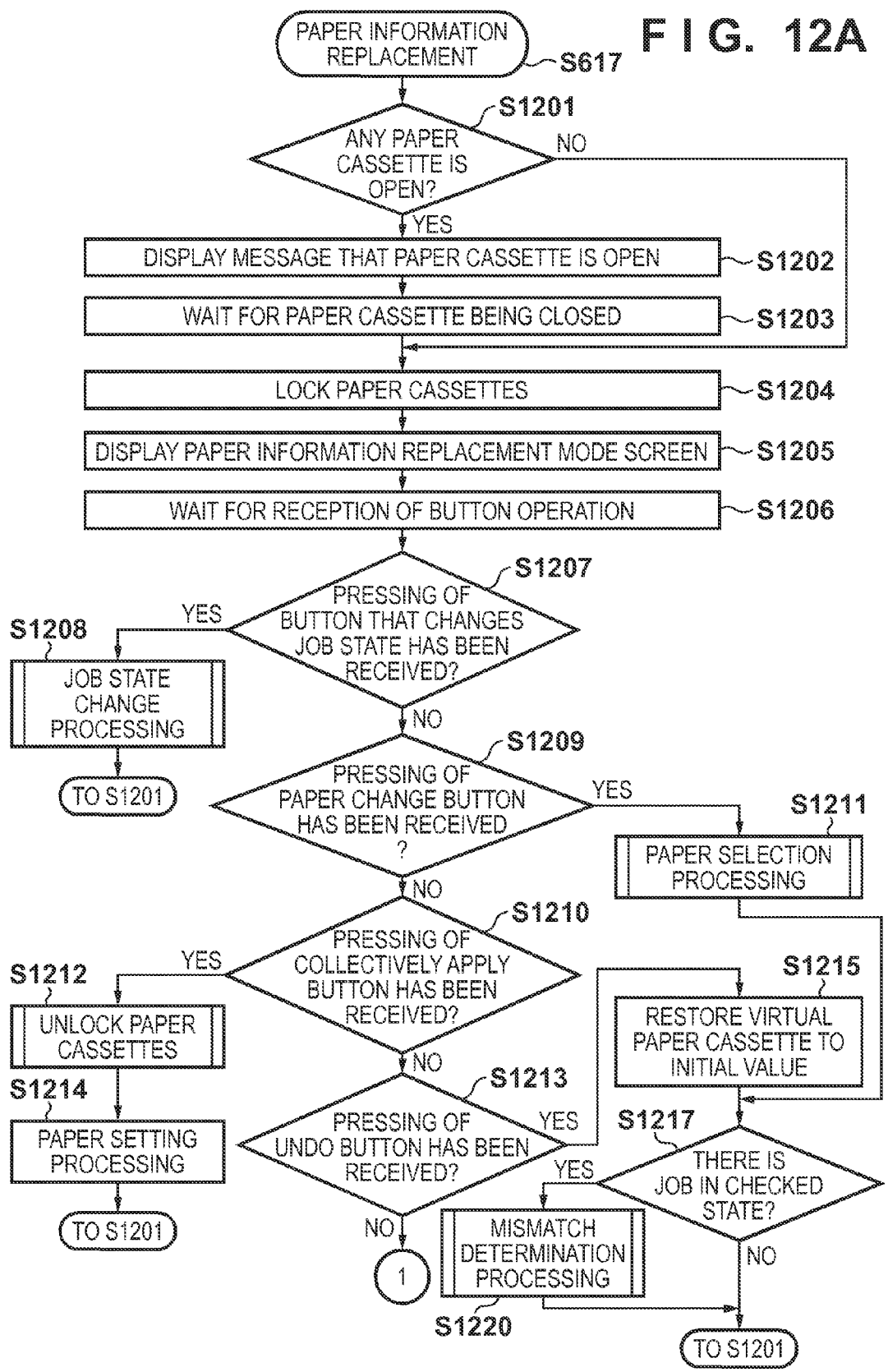

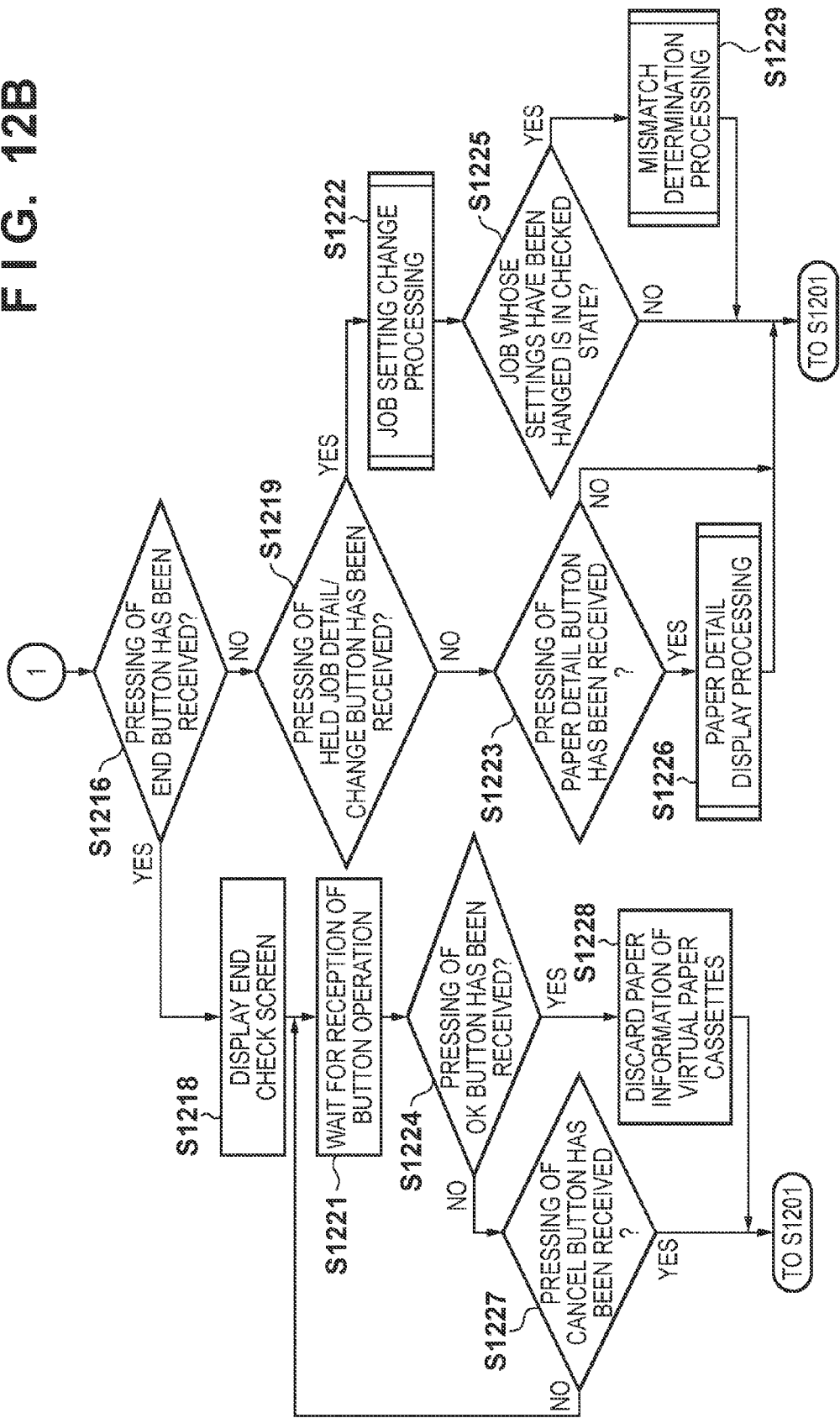

IMAGE FORMING APPARATUS, METHOD FOR CONTROLLING IMAGE FORMING APPARATUS, AND STORAGE MEDIUM STORING PROGRAM

BACKGROUND OF THE INVENTION

1. Field of the Invention

The present invention relates to an image forming apparatus, a method for controlling the image forming apparatus, and a storage medium storing a program.

2. Description of the Related Art

At printing agencies that produce a variety of printed matters, an operator executes a print job based on a printing operation list that is created considering various factors, such as delivery time of printed matters, expected quality, and the time taken for printing. In this case, in general, print jobs are accumulated in a printing apparatus, and job management functions are carried out, such as editing of each job, start of the print jobs, and check of duration and paper, which are done by the operator. Under such management, the operator sets necessary paper in the printing apparatus and starts printing after confirming that printing can be performed, so as to carry out the printing in accordance with the printing operation list.

Japanese Patent Laid-Open No. 2011-9980 discloses a technique for assisting the aforementioned checking operation. In Japanese Patent Laid-Open No. 2011-9980, paper that is set in a paper cassette is compared with paper to be used in a print job, and if the paper to be used in the print job is not set, the paper for print job is displayed with an empty box such that the operator can determine the paper that is not set.

Printing agencies deal with a large quantity of print jobs, and each operator deals with multiple print jobs in parallel. With the technique disclosed in the aforementioned patent document, if an operator becomes aware that necessary paper for a print job is not set, he/she replaces paper in order to resolve this situation. At this time, if the operator deals with multiple print jobs, there is a possibility that, after the state is resolved where paper for a specific print job is not ready, a state then occurs where paper for another print job is not ready instead. To resolve this state, it is necessary to restore the replaced paper to original paper, or to replace paper in another paper cassette.

To replace paper, it is necessary to perform an operation of operating the printing apparatus to replace the paper type, and furthermore, physically withdrawing a paper cassette and setting the paper therein, and if this operation is frequently performed, it requires much time and effort. In addition, an operation of restoring replaced paper to original paper is likely to lead to operation errors, such as placing paper in an incorrect cassette and setting an incorrect paper type. Moreover, in terms of printing efficiency, it is desirable to resolve the state in which paper is not ready, for as many print jobs as possible at a time, and to collectively start printing. However, since the paper replacement operation itself places a great burden as mentioned above, it is difficult to significantly reduce the burden during the paper replacement operation so as to achieve an improvement in printing efficiency.

SUMMARY OF THE INVENTION

An aspect of the present invention is to eliminate the above-mentioned problems with the conventional technology.

The present invention provides a technique that facilitates association between paper information and paper that is set in each of a plurality of paper feed trays, and enables necessary paper for a print job to be easily set in a predetermined paper feed tray.

The present invention in one aspect provides an image forming apparatus comprising: a first storing unit configured to store sheet information of sheets contained in a first sheet containing unit and a second sheet containing unit; a second storing unit configured to store sheet information that is set for the first sheet containing unit and the second sheet containing unit; a determination unit configured to determine, based on the sheet information stored in the second storing unit, whether or not a sheet to be used in a print job is contained in the first sheet containing unit and the second sheet containing unit; a changing unit configured to accept a change of the sheet information in the second storing unit and change the sheet information in the second storing unit, in a case where it is determined by the determination unit that the sheet to be used in the print job is not contained in the first sheet containing unit and the second sheet containing unit; and a storage control unit configured to change the sheet information in the first storing unit, using the sheet information in the second storing unit that has been changed by the changing unit.

The present invention is effective in facilitating association between paper information and paper that is set in each of a plurality of paper feed trays, and in enabling necessary paper for a print job to be easily set in a predetermined paper feed tray.

Further features of the present invention will become apparent from the following description of exemplary embodiments with reference to the attached drawings.

BRIEF DESCRIPTION OF THE DRAWINGS

FIGS. 3A to 3D are schematic views of screens displayed on an operation unit in the image forming apparatus.

FIGS. 5A to 5C are schematic views showing exemplary screens displayed on the operation unit in the image forming apparatus.

FIGS. 12A and 12B are another flowcharts illustrating paper information replacement processing in step S617 in FIG. 6.

DESCRIPTION OF THE EMBODIMENTS

Figure 1:
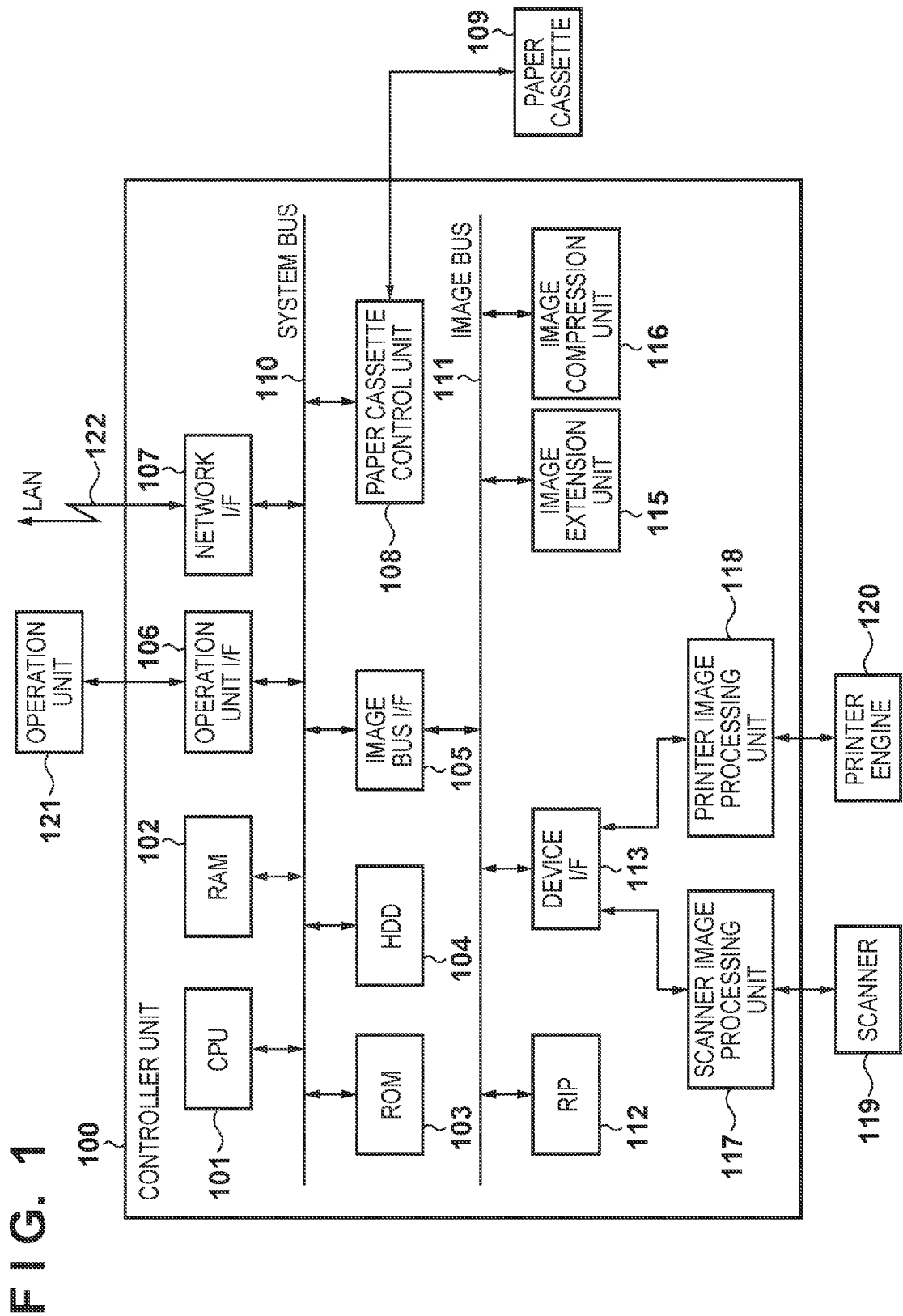
FIG. 1 is a block diagram showing an overall configuration of an image forming apparatus.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. The same reference numerals will be given to the same constituent elements, and will not be described.

A media mismatch determination function is a function of notifying an operator of a state where necessary paper for a print job is not ready. There are various methods for notifying the operator of the state where paper is not ready, such as a method of displaying a specific mark (icon, character string, color change, etc.) and a method of displaying a pop-up window or the like containing an alert message. The present embodiment will be described using a method of displaying an icon indicating a state where paper to be used in a job is not ready, on job list display. The state where paper is not ready refers to a state where paper is not assigned to a feed cassette. Note that the present invention is not limited to the method of displaying an icon, and various methods may be used, such as a message using characters or the like, a combination of display and sound, and an alert using colors, as long as the method enables the operator to be notified that necessary paper for a print job is not ready.

FIG. 1 is a block diagram showing an overall configuration of an image forming apparatus according to the present embodiment.

The image forming apparatus has a controller unit 100 that controls the overall apparatus, paper cassettes 109, a scanner 119, a printer engine 120, and an operation unit 121 for inputting an instruction given from the operator and displaying information for the operator. The scanner 119 is connected to a scanner image processing unit 117 in the controller unit 100, and the printer engine 120 is connected to a printer image processing unit 118 in the controller unit 100. The paper cassettes 109, the scanner 119, the printer engine 120, and the operation unit 121 are connected to the controller unit 100, and are controlled in accordance with instructions from the controller unit 100.

The controller unit 100 has a CPU 101. The CPU 101 is connected, via a system bus 110, to a RAM 102, a ROM 103, an HDD 104, an image bus I/F 105, an operation unit I/F 106, a paper cassette control unit 108, and a network I/F 107. The RAM 102 is a memory for providing a work area for the CPU 101. The RAM 102 is used as a set value storage memory for temporarily recording set parameters and the like, and also as an image memory for temporarily storing image data. The ROM 103 is a boot ROM, and stores a system boot program. The HDD 104 stores system software, parameter set value history, image data, and the like. The CPU 101 executes the boot program stored in the ROM 103, and deploys an OS and programs stored in the HDD 104 in the RAM 102. By the CPU 101 executing the programs deployed in the RAM 102, the image forming apparatus can execute later-described various operations.

The operation unit I/F 106 is an interface for performing input and output to/from the operation unit 121. The operation unit I/F 106 outputs image data to be displayed from the CPU 101 to the operation unit 121, and transmits information that is input by the operator via the operation unit 121 to the CPU 101. The paper cassette control unit 108 controls the paper cassettes 109, and transmits and receives data related to a state of each paper cassette 109 and transmits data related to an instruction to change the state of each paper cassette 109, in accordance with an instruction from the CPU 101. The paper cassettes 109 are cassettes in which paper to be used in printing is contained, and include paper cassettes provided in the image forming apparatus itself, as well as a large deck, an inserter, and the like that are connected to the paper cassette control unit 108 using a cable or via a network.

The network I/F 107 is connected to the LAN 122, and inputs and outputs information to/from the LAN 122. The image bus I/F 105 is a bus bridge that connects the system bus 110 and an image bus 111 to each other and converts data structure between these buses. An RIP 112 develops a PDL code received from the LAN 122 into a bitmap image. An image expansion unit 115 decodes and expands compressed and encoded image data stored in the HDD 104. An image compression unit 116 encodes, in a predetermined compression format, image data that has been processed by the RIP unit 112 and the scanner image processing unit 117 when the image data is stored in the HDD 104.

The device I/F 113 is connected to the scanner 119 and the printer engine 120 via the scanner image processing unit 117 and the printer image processing unit 118, and performs synchronous and asynchronous conversion of image data and transmission of data on set values, adjusted values, and device states. The scanner image processing unit 117 performs various kinds of processing including editing such as correction, processes, image area separation, scaling, and binarization processing, on image data that is input from the scanner 119. The scanner 119 has an automatic continuous manuscript feeder device and a platen reader device, which are not shown, and can read both faces of a manuscript. The scanner 119 also has a sensor (not shown) that detects opening and closing of a manuscript cover, the presence of a manuscript, and a manuscript size. Information detected by the scanner 119 and information of a state of the scanner 119 are transmitted to the CPU 101 via the scanner image processing unit 117 and the device I/F 113.

The printer image processing unit 118 performs correction that is appropriate for the printer engine 120, processing such as resolution conversion, and processing such as adjustment of an image printing position, on image data to be printed. The printer engine 120 possesses at least one feed cassette for storing print paper (not shown). The feed cassette detects the size of the stored paper and notifies the CPU 101 of the detected paper size via the printer engine 120, the printer image processing unit 118, and the device I/F 113. Device state information such as the amount of remaining paper in each feed cassette and an opened/closed state of the cassette is transmitted to the CPU 101 via the printer image processing unit 118 and the device I/F 113.

Figure 2:
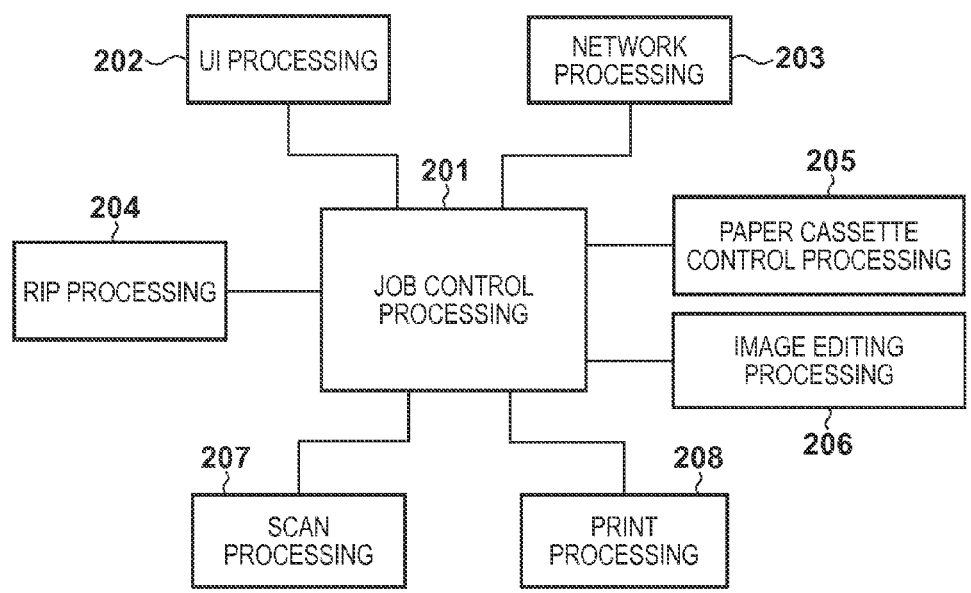
FIG. 2 is a block diagram illustrating software modules in the image forming apparatus.

FIG. 2 is a block diagram illustrating software modules in the image forming apparatus according to the present embodiment. Each software module shown here is realized mainly by the CPU 101 executing a program deployed in the RAM 102.

A job control processing module 201 controls each software module to control any kind of jobs, such as copying, printing, scanning, and UI processing, that are generated in the image forming apparatus. The UI processing module 202 mainly performs control related to the operation unit 121 and the operation unit I/F 106. The UI processing module 202 notifies the job control processing module 201 of the content of an operation to the operation unit 121 by the operator, and controls the content of display on a display screen of the operation unit 121 based on an instruction from the job control processing module 201. The UI processing module 202 also controls editing of rendering data to be displayed on the operation unit 121, and the like. A network processing module 203 is a module mainly for controlling communication with external devices performed via the network I/F 107, and controls communication with the devices on the LAN 122.

The network processing module 203, upon receiving a control command or data from the devices on the LAN 122, notifies the job control processing module 201 of the received content. The network processing module 203 also transmits a control command and data to the devices on the LAN 122 based on an instruction from the job control processing module 201. An RIP processing module 204 interprets PDL (page description language) based on an instruction from the job control processing module 201, and expands the PDL into a bitmap image by controlling the RIP unit 112 and performing rendering.

A paper cassette control processing module 205 controls the paper cassettes 109 based on an instruction from the job control processing module 201 to change the state of each paper cassette 109 and feed set paper. The paper cassette control processing module 205 also acquires the state of each paper cassette 109 and notifies the job control processing module 201 of the acquired state. An image edit processing module 206 controls an image processing unit (not shown) based on an instruction from the job control processing module 201 to perform image processing on a designated image. The image edit processing module 206 receives image data and image information (size, color mode, resolution, etc. of image data) from the job control processing module 201. The image edit processing module 206 then controls an image processing unit (not shown), the image expansion unit 115, and the image compression unit 116 to perform appropriate image processing on the image data, and notifies the job control processing module 201 of an image obtained after the image processing is performed. A scan processing module 207 controls the scanner 119 and the scanner image processing unit 117 to give an instruction to read a manuscript that is placed in the scanner 119, based on an instruction from the job control processing module 201. The scan processing module 207 then gives an instruction to perform image processing on image data of the read manuscript, at the scanner image processing unit 117. The scan processing module 207 also acquires information of the state of the scanner image processing unit 117 and the scanner 119, and notifies the job control processing module 201 of the acquired state information. A print processing module 208 receives, from the job control processing module 201, information such as image data, image information (size, color mode, resolution, etc. of image data), layout information (offset, enlargement/reduction, pagination, etc.), and output paper information (size, printing orientation). The print processing module 208 then controls the image expansion unit 115, the image compression unit 116, the image processing unit (not shown), and the printer image processing unit 118 to perform appropriate image processing on the image data, and controls the printer engine 120 to give an instruction to print on paper. The print processing module 208 also controls the printer image processing unit 118 and the printer engine 120 to give an instruction to print on paper. The print processing module 208 also acquires information of the state of the printer image processing unit 118 and the printer engine 120 to notify the job control processing module 201 of the acquired state information.

FIGS. 3A to 3D and FIGS. 4A and 4B are schematic views of screens displayed on the operation unit 121 in the image forming apparatus according to the present embodiment.

Figure 3C:
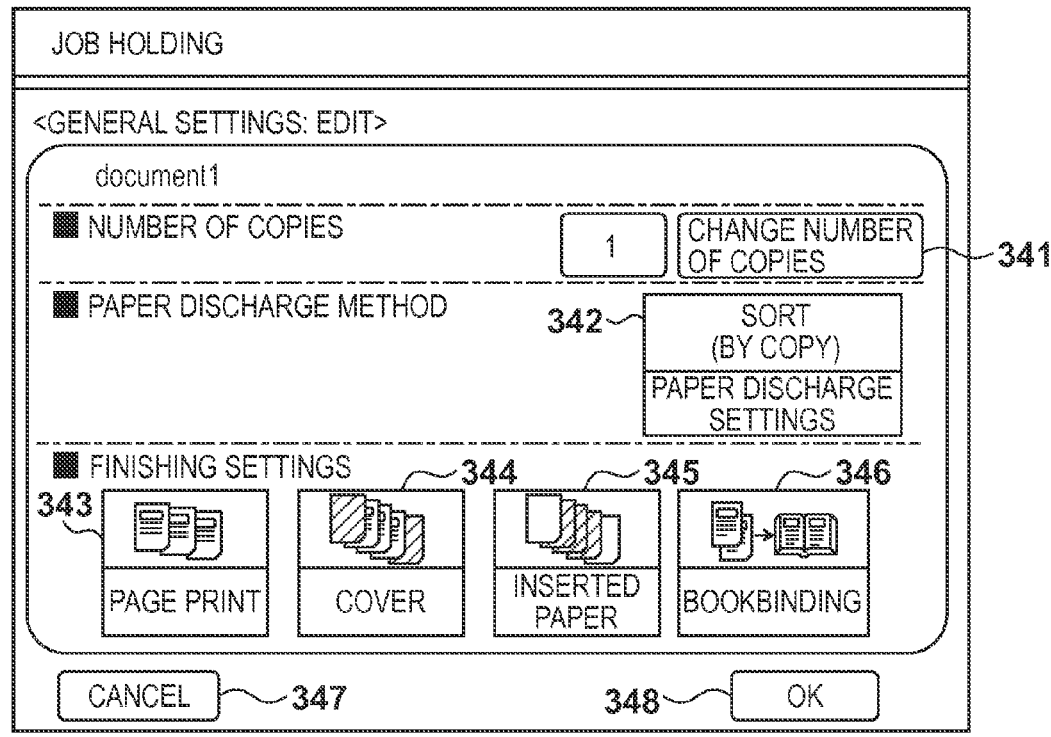
Figure 3D:
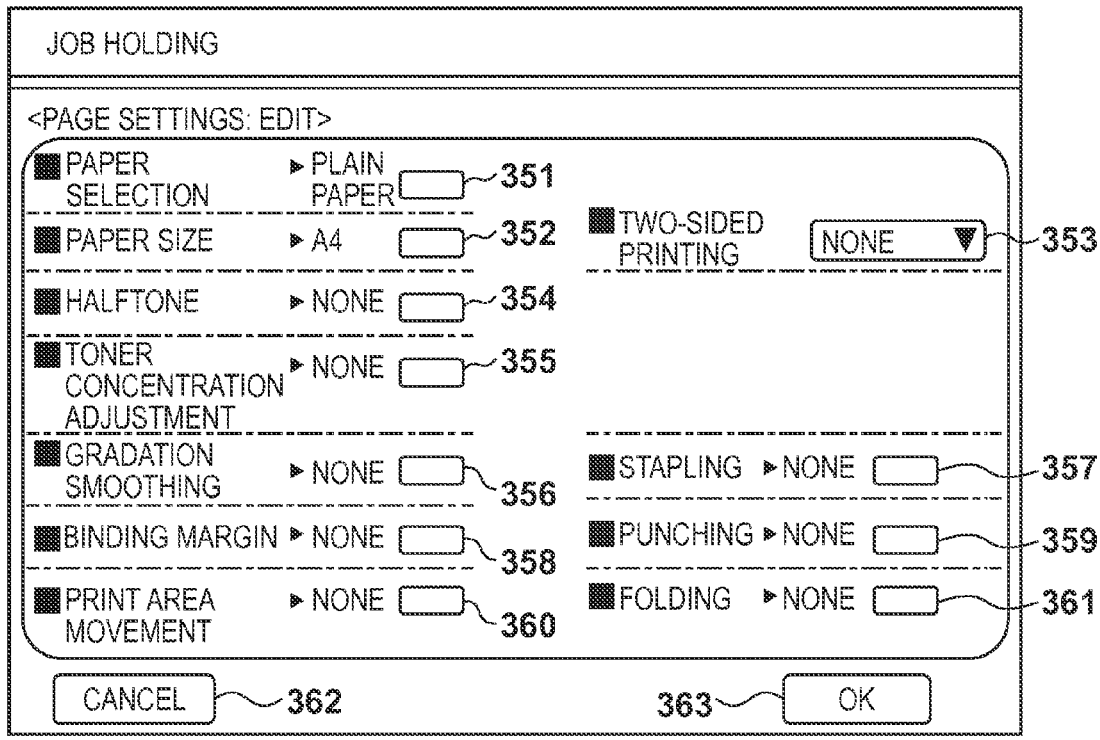

FIG. 3A shows an exemplary job holding screen. FIG. 3B shows an exemplary job setting edit screen in a job holding function. FIG. 3C shows an exemplary overall job setting edit screen, and FIG. 3D shows an exemplary screen after a page setting edit screen. Here, the job holding function refers to a function of holding a plurality of print jobs in the image forming apparatus such that printed matters can be obtained by executing the held print jobs in accordance with instructions from the operator.

As described above, the input to the operation unit 121 by the operator is transmitted to the CPU 101 via the operation unit I/F 106, and the screen displayed on the operation unit 121 is displayed under the control of the CPU 101. Transitions of the display screen of the operation unit 121 in accordance with the operation by the operator will now be described.

As a result of the operator inputting a request to use the job holding function from a wait screen (not shown) via the operation unit 121, the job holding screen shown in FIG. 3A is displayed. This job holding screen displays a list of print jobs registered and held in the image forming apparatus, and is a screen for giving instructions to print, delete, and edit jobs, and the like.

A held job list 301 displays a list of held jobs registered in this apparatus. Each row indicates an individual registered print job, and displays whether the registered job is checked, the job number, the job title, the name of the user who registered the job, the date and time of the job registration, and an icon indicating a media-mismatched state. Each row is a button for causing the corresponding job to enter a selected state, and also is a button for causing the corresponding job to enter a checked state. This button is selectable when there is a job corresponding to each row, and a row that does not correspond to any job cannot be selected. An icon indicating a media-mismatched state is display for indicating a state where paper to be used in the job is not set in the paper trays. Here, a specific icon is displayed if the paper to be used is not set in the paper cassettes. In FIG. 3A, this icon is displayed in the rows with the job titles "document1", "powerpoint", and "conference".

Job selection is performed in order to select a job to display the details thereof using a later-described detail/change button 302. A row corresponding to a selected job is displayed with a color that is different from that of other rows. In FIG. 3A, a job with the job title "conference" is selected. Here, there is no case where a plurality of jobs are simultaneously in the selected state, and if a row corresponding to a job is selected in a state where another job is already in the selected state, the newly-selected job then enters the selected state, and the selected state of the job that was formerly in the selected state is cancelled. In the case of selecting a button of a row corresponding to a job that is already in the selected state, the selected state of this job is cancelled.

A job in the checked state indicates that the job is subjected to a display select user only button 304, a paper replacement mode button 305, and a print start button 308, which will be described later. A plurality of jobs can be simultaneously caused to enter the checked state by selecting, in a state where there is a job that is already in the checked state, a row corresponding to another job in the held job list 301. When a job enters the checked state, the order in which the job was caused to enter the checked state is stored. In a row corresponding to a job that is in the checked state, a mark indicating that the job has entered the checked state and the number indicating the order in which the job entered the checked state are displayed in a predetermined column. In FIG. 3A, the jobs with the job titles "booklet device", "text", and "conference" have been checked in this order. If a row corresponding to a job that is already in the checked state is selected, the checked state of this job is cancelled. If another job is after the job whose checked state is cancelled, the other job is shifted forward by one.

The detail/change button 302 is selectable when any of the rows in the held job list 301 is selected and the corresponding job is in the selected state. Upon the detail/change button 302 being selected, the job setting edit screen in FIG. 3B is displayed. The details of the job setting edit screen will be described later.

A check all/uncheck all button 303 is selectable when at least one job is registered in the held job list 301. The check all/uncheck all button 303 is a check all button when no job is in the checked state, and is an uncheck all button when at least one job is in the checked state. Upon the check all button 303 being selected, all jobs registered in the held job list 301 enter the checked state. The order in which jobs entered the checked state is the order of registration in the held job list 301. On the other hand, upon the uncheck all button 303 being selected, the checked state of all held jobs in the checked state is cancelled.

A display select user only/display all job button 304 is a display all job button when in a state where the display select user only button has been selected and only jobs of a select user are displayed. On the other hand, the button 304 is a display select user only button when in a state where the display all job button has been selected and all jobs are displayed. The button 304 is the display select user only button in its initial state. The display select user only button 304 is selectable when there is a job in the selected state. Upon the display select user only button 304 being selected, only jobs having the same user name as that of the job that is in the selected state at this time are displayed in the held job list 301. Upon the display all job button 304 being selected, all held jobs registered in the image forming apparatus are displayed in the held job list 301.

The paper replacement mode button 305 is a button for switching to a later-described paper information replacement mode, and upon this button being selected, a paper information replacement mode screen in FIG. 5A is displayed. In Embodiment 1, the paper replacement mode button 305 is selectable when at least one job in the held job list 301 is in the checked state.

Held job list arrow buttons 306 and 307 are buttons for giving instructions to scroll the held job list 301. An upper arrow button 306 is unselectable when the uppermost part of the list is displayed in the held job list 301, and a lower arrow button 307 is unselectable when the lowermost part thereof is displayed. Upon the upper arrow button 306 being selected in a selectable state, the previous page of the page that is currently displayed in the held job list 301 is displayed. Upon the lower arrow button 307 being selected, the next page of the page that is currently displayed in the held job list 301 is displayed.

The print start button 308 is selectable when at least one job in the held job list 301 is in the checked state. Upon the print start button 308 being selected, print processing for a job that is in the checked state at this time is commenced. The job for which print processing has been commenced is added to a later-described print job list 309 in FIG. 3A. If a delete-after-printing setting (not shown) is selected for the job that has been added to the print job list 309, registration of this job is deleted from the held jobs after the printing is finished, and is erased from the held job list 301. Regardless of whether the delete-after-printing setting is selected, the checked state of the job registered in the print job list 309 is cancelled.

The print job list 309 displays a list of print jobs that are registered in the image forming apparatus and for which an instruction to start printing has been given. Each row indicates an individual registered job, and displays print registration time of each registered and checked job, the job title, the job processing status, and waiting time for job completion. Each row is a button for causing the corresponding job to enter the selected state. This button is selectable when there is a job corresponding to each row, and a row that does not correspond to any job cannot be selected. The selected state of a print job is for selecting a job to display the details thereof or to stop printing thereof using a detail/change button 310 and a print stop button 311, which will be described later. A row corresponding to a selected job is displayed with a color that is different from that of other rows. There is no case where a plurality of jobs are simultaneously in the selected state, and if a row corresponding to a job is selected in a state where another job is already in the selected state, the newly-selected job then enters the selected state, and the selected state of the job that was formerly in the selected state is cancelled. In the case of selecting a button of a row corresponding to a job that is already in the selected state, the selected state of the job is cancelled.

The detail/change button 310 is selectable when any of the rows in the print job list 309 is selected and the corresponding job is in the selected state. Upon the detail/change button 310 being selected, the job setting edit screen shown in FIG. 3B is displayed. The details of the job setting edit screen will be described later.

The print stop button 311 is selectable when any of the rows in the print job list 309 is selected and the corresponding job is in the selected state. Upon the print stop button 311 being selected, processing for the job that is in the selected state at this time is stopped, and this job is deleted from the registered print job. The deleted job is erased from the display of the print job list 309.

Print job list arrow buttons 312 and 313 are buttons for giving instructions to scroll the print job list 309. An upper arrow button 312 is unselectable when the uppermost part of the list is displayed in the held job list 309, and a lower arrow button 313 is unselectable when the lowermost part thereof is displayed. Upon the upper arrow button 312 being selected when in a selectable state, the previous page of the page that is currently displayed in the print job list 309 is displayed. Upon the lower arrow 313 being selected, the next page of the page that is currently displayed in the print job list 309 is displayed.

If one of the jobs in the held job list 301 enters the selected state and then the detail/change button 302 is selected on the job holding screen in FIG. 3A, the job setting edit screen in FIG. 3B is displayed. This job setting edit screen is a screen for checking and changing detailed settings of an editing target job. The editing target job is a job that is in the selected state when the detail/change button 302 is pressed.

In a general setting list 321, general job settings for the editing target job in the job holding screen in FIG. 3A are displayed. General settings for a job include the number of copies, a paper discharge method, print settings, bookbinding settings, and the like. In FIG. 3B, "1" and "sorting" are designated as the number of copies and the finishing, respectively. The number and the content of items to be displayed change depending on the general settings configured for the aforementioned held jobs. General setting list arrow buttons 322 and 323 are buttons for giving instructions to scroll the general setting list 321. An upper arrow button 322 is unselectable when the uppermost part of the list is displayed in the general setting list 321, and a lower arrow button 323 is unselectable when the lowermost part thereof is displayed. Upon the upper arrow button 322 being selected when in a selectable state, the previous page of the page that is currently displayed in the general setting list 321 is displayed. Upon the lower arrow button 323 being selected, the next page of the page that is currently displayed in the general setting list 321 is displayed.

A general setting edit button 324 is a button for opening a general setting edit screen in FIG. 3C for editing the general job settings. Upon the general setting edit button 324 being pressed, the general setting screen shown in FIG. 3C, for example, is displayed on the operation unit 121.

A page setting list 325 in FIG. 3B displays the content of settings in the unit of pages of the editing target job. Each row indicates the content of individual settings, and displays a mark indicating whether the pages are in the selected state, the page range to which registered settings are applied, the paper size and the paper type to be used, and the faces to be printed. Each row is a button for causing corresponding page settings to enter the selected state. This button is selectable when there are page settings corresponding to each row, and cannot be selected when no page settings corresponding to the row are displayed. The selected state of the page settings is for selecting page settings to display the details thereof using a later-described page setting edit button 329. A mark indicating the selected state is displayed in the row corresponding to the selected page settings. In FIG. 3B, the row of the paper type "plane paper" is selected. If the page settings that are already in the selected state are selected, the selected state of these page settings is cancelled. Multiple sets of page settings can be caused to enter the selected state simultaneously.

Page setting list arrow buttons 326 and 327 are buttons for giving instructions to scroll the page setting list 325. An upper arrow button 326 is unselectable when the uppermost part of the list is displayed in the page setting list 325, and a lower arrow button 327 is unselectable when the lowermost part thereof is displayed. Upon the upper arrow button 326 being selected when in a selectable state, the previous page of the page that is currently displayed in the page setting list 325 is displayed. Upon the lower arrow button 327 being selected, the next page of the page that is currently displayed in the page setting list 325 is displayed.

When an unselect/select all button 328 is selected, the button 328 is a select all button if no page settings are in the selected state, and is an unselect button if at least one set of page settings is in the selected state. Upon the select all button 328 being selected, all sets of page settings registered in the page setting list 325 enter the selected state. The details of the selected state are as described above. Upon the unselect button 328 being selected, the selected state of all sets of page settings in the selected state is cancelled.

The page setting edit button 329 is selectable when at least one set of page settings is in the selected state. Upon the page setting edit button 329 being selected, the display of the operation unit 121 transitions to a page setting edit screen in FIG. 3D. A job delete button 330 is a button for deleting the editing target job. Upon the job delete button 330 being selected, the editing target job is erased, and all print settings related to this job are simultaneously deleted as well. After the deletion, the display of the operation unit 121 transitions to the job holding screen in FIG. 3A. An OK button 331 is for ending the editing of a held job. Upon the OK button 331 being selected, the display of the operation unit 121 transitions to the job holding screen in FIG. 3A.

Upon the general setting edit button 324 in FIG. 3B being selected, the display of the operation unit 121 transitions to the general job setting edit screen in FIG. 3C. The general job setting edit screen is a screen for editing general settings for the editing target job. The editing target job is the same job as the editing target job in the job setting edit screen in FIG. 3B.

A number-of-copies change button 341 is a button for changing the number of copies. Upon selecting the number-of-copies change button 341, the display transitions to a number-of-copies input screen (not shown). The number of copies that is input on this number-of-copies input screen is displayed in a number-of-copies display box, and is temporarily stored as the number of copies.

A paper discharge setting button 342 is a button for changing the method for discharging paper. Upon the paper discharge setting button 342 being selected, the display transitions to a paper discharge method setting screen (not shown). Settings that are input on the paper discharge method setting screen are temporarily stored, and paper discharge method setting information to be displayed with the paper discharge method setting button is updated. A page print setting button 343 is a button for changing page print settings. Upon the page print setting button 343 being selected, the display transitions to a page print setting screen (not shown). Settings that are input on the page print setting screen are temporarily stored, and page print setting information to be displayed with the page print setting button is updated. A cover setting button 344 is a button for changing cover settings. Upon the cover setting button 344 being selected, the display transitions to a cover setting screen (not shown). Settings that are input on the cover setting screen are temporarily stored, and cover setting information to be displayed with the cover setting button is updated. An inserted paper setting button 345 is a button for changing inserted paper settings. Upon the inserted paper setting button 345 being selected, the display transitions to an inserted paper setting screen (not shown). Settings that are input on the inserted paper setting screen are temporarily stored, and inserted paper setting information to be displayed with the inserted paper setting button is updated. A bookbinding setting button 346 is a button for changing bookbinding settings. Upon the bookbinding setting button 346 being selected, the display transitions to a bookbinding setting screen (not shown). Settings that are input on the bookbinding setting screen are temporarily stored, and bookbinding setting information to be displayed with the bookbinding setting button is updated. A cancel button 347 is for cancelling and ending the editing of general job settings on the screen in FIG. 3C. If selection of the cancel button 347 is received, the temporarily stored settings of the number of copies, paper discharge, page print, cover, inserted paper, and bookbinding are discarded, and the display transitions to a pre-transition screen. An OK button 348 is for ending the editing of general job settings on the screen in FIG. 3C. If an instruction to the OK button 348 is received, the temporarily stored settings of the number of copies, paper discharge, page print, cover, inserted paper, and bookbinding are registered as the general settings for the held job displayed on the general job setting edit screen in FIG. 3C. After registration of the general settings ends, the display transitions to a pre-transition screen.

Upon the page setting edit button 329 being selected in FIG. 3B, the display of the operation unit 121 transitions to the page setting edit screen in FIG. 3D. The page setting edit screen is a screen for editing settings for an editing target page range of the editing target job. The editing target job is the same as the editing target job on the job setting edit screen in FIG. 3B, and the editing target page range is the page range that was in the selected state when the page setting edit button 329 was selected on this job setting edit screen.

A paper selection button 351 is a button for changing the type of paper to be used in printing. Upon the paper selection button 351 being selected, the display transitions to a later-described paper cassette selection screen in FIG. 4A. If a paper feed tray or a paper type is selected on the paper cassette selection screen in FIG. 4A or a paper type selection screen in FIG. 4B, the paper type to be displayed with the paper selection button 351 is updated, and the selected paper type is temporarily stored as the paper type to be used in printing.

A paper size selection button 352 is a button for changing the paper size to be used in printing. The paper size selection button 352 is selectable only if a paper type that does not have any paper size is selected using the paper selection button 351. If a paper type having a paper feed tray or a paper size is selected, the selection of the paper size selection button 352 is not accepted. Upon the paper size selection button 352 being selected, the display transitions to a paper size selection screen (not shown). Upon a paper size being selected on the paper size selection screen, the paper size to be displayed on the paper size selection screen is updated, and the selected paper size is temporarily stored as the paper size to be used in printing.

A two-sided printing selection button 353 is a button for changing whether or not to perform two-sided printing. The two-sided printing selection button 353 is selectable only if paper with which two-sided printing can be performed is selected using the paper selection button 351. Upon the two-sided printing selection button 353 being selected, a pull-down menu (not shown) is displayed. This pull-down menu contains items for selecting whether or not to perform two-sided printing. After whether or not to perform two-sided printing is selected from the pull-down menu, two-sided printing settings to be displayed with the two-sided printing selection button 353 are updated, and this selection is temporarily stored as the two-sided printing settings.

A halftone setting button 354 is a button for changing halftone settings. Upon the halftone setting button 354 being selected, the display transitions to a halftone setting screen (not shown). Upon halftone being selected on the halftone setting screen, the selected halftone is temporarily stored, and the display of the halftone setting button 354 is updated. A toner concentration (density) adjustment button 355 is a button for changing toner concentration adjustment settings. Upon the toner concentration adjustment button 355 being selected, the display transitions to a toner concentration adjustment screen (not shown). Upon toner concentration adjustment being selected on the toner concentration adjustment screen, the selected toner concentration adjustment is temporarily stored, and the display of the toner concentration adjustment button 355 is updated. A gradation smoothing setting button 356 is a button for changing gradation smoothing settings. Upon the gradation smoothing setting button 356 being selected, the display transitions to a gradation smoothing setting screen (not shown). Upon gradation smoothing being selected on the gradation smoothing setting screen, the selected gradation smoothing is temporarily stored, and the display of the gradation smoothing setting button 356 is updated.

A stapling setting button 357 is a button for changing stapling settings. Upon the stapling setting button 357 being selected, the display transitions to a stapling setting screen (not shown). Upon stapling being selected on the stapling setting screen, the selected stapling is temporarily stored, and the display of the stapling setting button 357 is updated. A binding margin setting button 358 is a button for changing binding margin settings. Upon the binding margin setting button 358 being selected, the display transitions to a binding margin setting screen (not shown). Upon a binding margin being selected on the binding margin setting screen, the selected binding margin is temporarily stored, and the display of the binding margin setting button 358 is updated. A punching setting button 359 is a button for changing punching settings. Upon the punching setting button 359 being selected, the display transitions to a punching setting screen (not shown). Upon punching being selected on the punching setting screen, the selected punching is temporarily stored, and the display of the punching setting button 359 is updated. A print area movement setting button 360 is a button for changing settings of movement of the print area. Upon the print area movement setting button 360 being selected, the display transitions to a print area movement setting screen (not shown). Upon movement of the print area being selected on the print area movement setting screen, the selected movement of the print area is temporarily stored, and the display of the print area movement setting button 360 is updated. A folding setting button 361 is a button for changing folding settings. Upon the folding setting button 361 being selected, the display transitions to a folding setting screen (not shown). Upon folding being selected on the folding setting screen, the selected folding is temporarily stored, and the display of the folding setting button 361 is updated. A cancel button 362 is for cancelling and ending the editing of the job page settings. If selection of the cancel button 362 is received, the temporarily stored settings of paper, paper size, halftone, toner concentration adjustment, gradation smoothing, binding margin, movement of the print area, stapling, punching, and folding are discarded, and the display transitions to a pre-transition screen. An OK button 363 is for ending the editing of the job page settings. If selection of the OK button 363 is received, the temporarily stored settings of paper, paper size, halftone, toner concentration adjustment, gradation smoothing, binding margin, movement of the print area, stapling, punching, and folding are registered for the editing target page range of the editing target job. After registration of the page settings thus ends, the display transitions to a pre-transition screen.

Figure 4A:
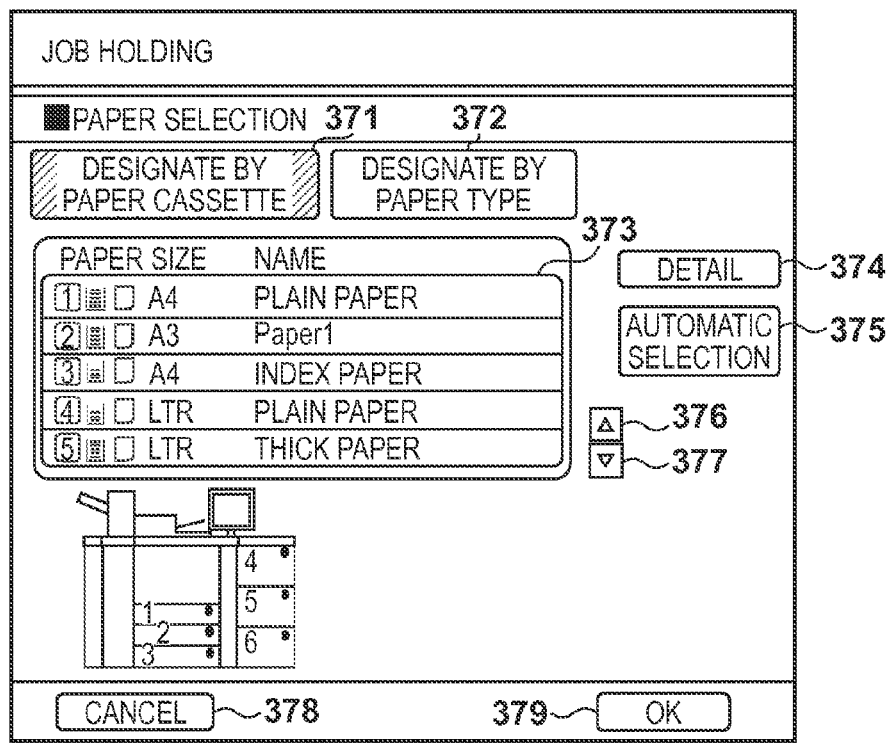
FIGS. 4A and 4B are schematic views of screens displayed on the operation unit in the image forming apparatus.
Figure 4B:
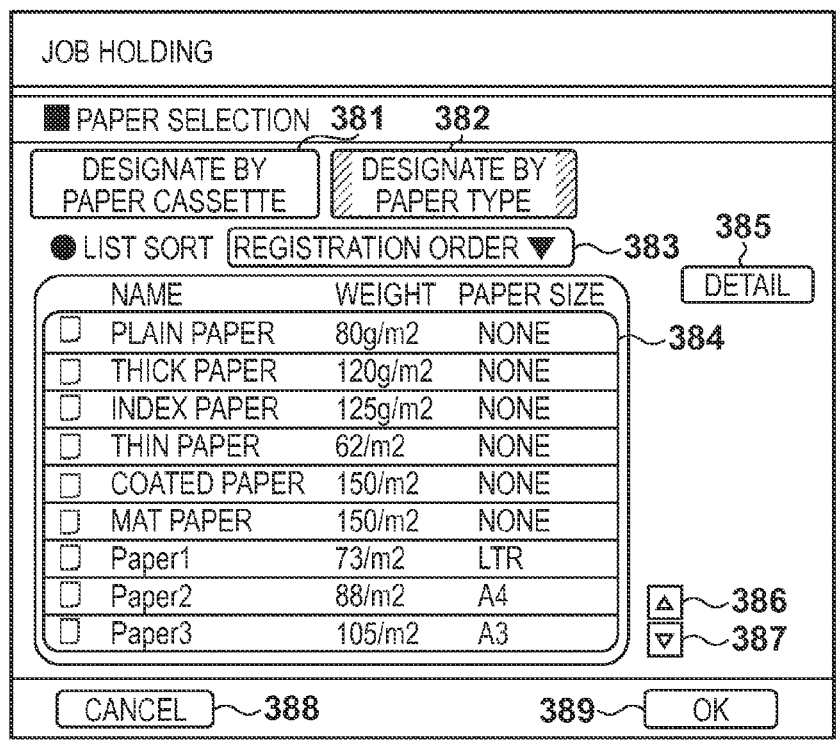

FIG. 4A shows a screen for setting print paper by paper cassette. FIG. 4B shows a screen for setting print paper by paper type.

Upon the paper selection button 351 being selected in FIG. 3D described above, the display of the operation unit 121 transitions to the paper cassette selection screen in FIG. 4A. This paper cassette selection screen is a screen for setting the paper to be used for the editing target page range of the editing target job, based on the paper cassettes 109. The editing target job and the editing target page range are the same as those on the job page setting edit screen in FIG. 3D.

A designate by paper cassette button 371 and a designate by paper type button 372 are buttons for selecting the method for selecting a paper type. The designate by paper cassette button 371 and the designate by paper type button 372 correspond to the paper cassette selection screen in FIG. 4A and a later-described paper type selection screen in FIG. 4B, respectively. Each of these buttons is in the selected state when the corresponding screen is open, and cannot be doubly selected. As described above, in the paper cassette selection screen in FIG. 4A, the designate by paper cassette button 371 is in the selected state, and cannot be selected.

If the designate by paper type button 372 is selected in FIG. 4A, the display transitions to the paper type selection screen in FIG. 4B. At this time, the selected state of a paper cassette in a paper cassette list 373 or an automatic selection button 375 that has been in the selected state is cancelled.

The paper cassette list 373 in FIG. 4A is a list of the paper cassettes 109 provided in the image forming apparatus and a list of paper that is set in each cassette, and the content of the lists changes depending on the configuration of the image forming apparatus. Each row corresponds to a cassette of the device, and displays the remaining amount of the paper supplied in the cassette (icon), the paper size, and the paper type name. Each row is a button for causing the corresponding cassette to enter the selected state. This button is selectable when there is a cassette corresponding to each row, and a row that does not correspond to any cassette cannot be selected. A cassette in the selected state is a cassette whose details is to be displayed using a later-described detail button 374, and is used for selecting print paper using a later-described OK button 379. A row corresponding to a selected cassette is displayed with a color that is different from that of other rows. There is no case where a plurality of cassettes are simultaneously in the selected state, and if a row corresponding to a cassette is selected in a state where another cassette is already in the selected state, the newly-selected cassette enters the selected state, and the selected state of the cassette that was formerly in the selected state is cancelled. In the case of selecting a button of a row corresponding to a cassette that is already in the selected state, the selected state of this cassette is cancelled.

The detail button 374 is selectable when any of the rows in the paper cassette list 373 is selected and the corresponding cassette is in the selected state. Upon the detail button 374 being selected, a paper cassette edit screen (not shown) is displayed.

The automatic selection button 375 is a button for selecting automatic selection of a paper cassette. It is not possible to cause both a cassette in the paper cassette list 373 and the automatic selection button 375 to enter the selected state. If the automatic selection button 375 is caused to enter the selected state when any of the cassettes in the paper cassette list 373 is in the selected state, the selected state of the cassette is cancelled. If any of the cassettes in the paper cassette list 373 is caused to enter the selected state when the automatic selection button 375 is in the selected state, the selected state of the automatic selection button 375 is cancelled.

Paper cassette list arrow buttons 376 and 377 are buttons for giving instructions to scroll the paper cassette list 373. An upper arrow button 376 is unselectable when the uppermost part of the list is displayed in the paper cassette list 373, and a lower arrow button 377 is unselectable when the lowermost part thereof is displayed. Upon the upper arrow button 376 being selected when in a selectable state, the previous page of the page that is currently displayed in the paper cassette list 373 is displayed. Upon the lower arrow button 377 being selected, the next page of the page that is currently displayed in the paper cassette list 373 is displayed.

A cancel button 378 is for cancelling and ending the paper selection. If selection of the cancel button 378 is received, the display transitions to a pre-transition screen. At this time, the selected state of a paper cassette in the paper cassette list 373 or the automatic selection button 375 that has been in the selected state is cancelled. An OK button 379 is for ending the paper selection. The OK button 379 is selectable when any of the paper cassettes in the paper cassette list 373 is in the selected state, or the automatic selection button 375 is in the selected state. If selection of the OK button 379 is received, the paper cassette in the selected state or automatic selection is registered as the paper to be used for the editing target page range. After registration of the page settings ends, the display transitions to a pre-transition screen.

If the designate by paper type button 372 is selected in FIG. 4A, the display of the operation unit 121 transitions to the paper type selection screen in FIG. 4B. The paper type selection screen in FIG. 4B is a screen for selecting the paper to be used for the editing target page range of the editing target job by paper type. The editing target job and the editing target page range are the same as those on the previous screen, namely the job page setting edit screen (FIG. 3D).

In FIG. 4B, the designate by paper cassette button 381 and the designate by paper type button 382 are buttons for selecting a method for selecting a paper type. The designate by paper cassette button 381 and the designate by paper type button 382 correspond to the paper cassette selection screen in FIG. 4A and the paper type selection screen in FIG. 4B, respectively. Each of these buttons is in the selected state when the corresponding screen is open, and cannot be doubly selected.

If the designate by paper type button 381 is selected, the display transitions to the paper cassette selection screen in FIG. 4A. At this time, the selected state of a paper type in a paper type list 384 that has been in the selected state in FIG. 4B is cancelled. As described above, the designate by paper type button 382 is in the selected state in the paper type selection screen in FIG. 4B.

A paper type list sort button 383 is for rearranging the display order of the paper types to be displayed in the paper type list 384. Upon the paper type list sort button 383 being selected, a pull-down menu (not shown) is displayed. This pull-down menu contains items "display in registration order", "display in name order", and the like. In FIG. 4B, "registration order" is selected as the sorting method. Upon the sorting method being selected from the pull-down menu, the order in the paper type list is changed to the selected one, and the display of the paper type list 384 is updated.

The paper type list 384 displays a list of paper types registered in the image forming apparatus. Each row corresponds to a paper type, and displays the name, the weight, and the size of the paper. Each row is a button for causing the corresponding paper type to enter the selected state. The button is selectable when there is a paper type corresponding to the row, and cannot be selected when no paper type corresponds to the row. The selected state of a paper type indicates a state for selecting a paper type to display the details thereof using a later-described detail button 385, and for selecting print paper by paper type using a later-described OK button 389. A row corresponding to a selected paper type is displayed with a color that is different from that of other rows. There is no case where a plurality of paper types are simultaneously in the selected state, and if a row corresponding to a paper type is selected in a state where another paper type is already in the selected state, the newly-selected paper type enters the selected state, and the selected state of the paper type that was formerly in the selected state is cancelled. In the case of selecting the button of a row corresponding to a paper type that is already in the selected state, the selected state of this paper type is cancelled.

The detail button 385 is selectable when any of the rows in the paper type list 384 is selected and the corresponding paper type is in the selected state. Upon the detail button 385 being selected, a paper type edit screen (not shown) is displayed. Paper type list arrow buttons 386 and 387 are buttons for giving instructions to scroll the paper type list 384. An upper arrow button 386 is unselectable when the uppermost part of the list is displayed in the paper type list 384, and a lower arrow button 387 is unselectable when the lowermost part thereof is displayed. Upon the upper arrow button 386 being selected when in a selectable state, the previous page of the page that is currently displayed in the paper type list 384 is displayed. Upon the lower arrow button 387 being selected, the next page of the page that is currently displayed in the paper type list 384 is displayed.

A cancel button 388 is for cancelling and ending the paper selection. If selection of the cancel button 388 is received, the display transitions to a pre-transition screen. At this time, the selected state of a paper type in the paper type list 384 that has been in the selected state is cancelled. An OK button 389 is for ending the paper selection. The OK button 389 is selectable when any of the paper types in the paper type list 384 is in the selected state. If an instruction to the OK button 389 is received, the paper type in the selected state is registered as the paper to be used for the editing target page range. After registration of the page settings ends, the display transitions to a pre-transition screen.

Figure 5C:
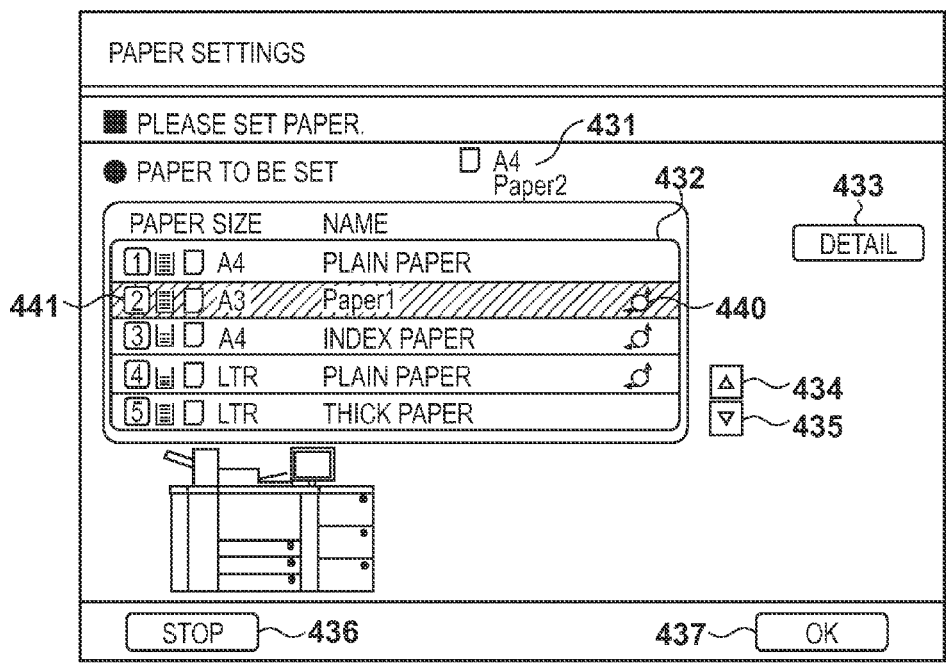

FIGS. 5A to 5C are schematic views showing exemplary screens displayed on the operation unit 121 in the image forming apparatus according to the present embodiment. FIG. 5A shows a paper information replacement mode screen in the job holding function. FIG. 5B shows a screen for editing paper information to be set for a cassette. FIG. 5C shows an exemplary screen for giving the operator an instruction to replace paper in a paper cassette. As described above, the input to the operation unit 121 from the operator is transmitted to the CPU 101 through the operation unit I/F 106. The screen displayed on the operation unit 121 will be described regarding the exemplary screens displayed under the control of the CPU 101 and transitions of the display screen of the operation unit 121 in accordance with the operation by the operator.

FIG. 5A shows an exemplary paper information replacement mode screen in the job holding function.

The paper information replacement mode screen is constituted by two parts, namely the upper and lower parts of the screen. The upper part displays a list of held jobs based on a held job list 401. The lower part displays a virtual paper cassette list based on a list 408 of second paper cassette information (which will be referred to hereinafter as virtual paper cassettes), which is creased by copying first paper cassette information that stores information of the paper cassettes 109.

The held job list 401 displays a list of jobs that are targets of media mismatch determination in the paper information replacement mode. Each row indicates an individual registered job, and displays whether the registered job is checked and the job number, the job title, the name of the user who registered the job, the date and time of the job registration, and an icon indicating a media-mismatched state. Each row is a button for causing the corresponding job to enter the selected state, and also is a button for causing the corresponding job to enter the checked state. This button is selectable when there is a job corresponding to each row, and cannot be selected in the case where only a few jobs are registered and no job corresponds to the row.

The media-mismatched state in the held job list 401 is a result of media mismatch determination based on the paper information in the later-described virtual paper cassette list 408. Job selection is performed in order to select a job to display the details thereof using a later-described detail/change button 402. A row corresponding to a selected job is displayed with a color that is different from that of other rows. There is no case where a plurality of jobs are simultaneously in the selected state, and if a row corresponding to a job is selected in a state where another job is already in the selected state, the newly-selected job then enters the selected state, and the selected state of the job that was formerly in the selected state is cancelled. In the case of selecting a button of a row corresponding to a job that is already in the selected state, the selected state of the job is cancelled.

The checked state of a job is a state to be a mismatch determination target at the time of changing paper information of a later-described display select user only button 404 and the virtual paper cassette list 408. A plurality of jobs can be simultaneously caused to enter the checked state by selecting, in a state where a job is already in the checked state, a row corresponding to another job. The order in which jobs are caused to enter the checked state is stored for the checked state. In a row corresponding to a job in the checked state, a mark (tick) indicating that the job has entered the checked state and the number indicating the order in which the job has entered the checked state are displayed in a predetermined column. In FIG. 5A, all jobs displayed in the held job list 401 are checked. In the case of selecting a row corresponding to a job that is already in the checked state, the checked state of the job is cancelled. If another job is after the job whose checked state is cancelled, the other job is shifted forward by one.

The detail/change button 402 is selectable when any of the rows in the held job list 401 is selected and the corresponding job is in the selected state. Upon the detail/change button 402 being selected, the job setting edit screen in FIG. 3B is displayed. The details of this job setting edit screen are as already described with reference to FIG. 3B.

A select all/unselect all button 403 is selectable when at least one job is registered in the held job list 401. The select all/unselect all button 403 is a button for causing all jobs to enter the checked state when no job in the held job list 401 is in the checked state, and for unchecking all jobs when at least one job is in the checked state.

Upon the select all button 403 being selected, all jobs registered in the held job list 401 enters the checked state. The order in which the job enters the checked state at this time is the order of registration in the held job list 401. Upon the unselect all button 403 being selected, the checked state of all held jobs in the checked state is cancelled.

The display select user only/display all job button 404 is a display all job button when the button 404 is selected in a state where only jobs of a select user are displayed, and is a display select user only button when the button 404 is selected in a state where all jobs are displayed. The button 404 initially is the display select user only button. The display select user only button 404 is selectable when there is a job in the selected state. Upon the display select user only button 404 being selected, only jobs having the same user name as that of the job that is in the selected state at this time are displayed in the held job list 401. On the other hand, upon the display all job button 404 being selected, all held jobs registered in the image forming apparatus are displayed in the held job list 401. Held job list arrow buttons 405 and 406 are buttons for giving instructions to scroll the held job list 401. An upper arrow button 405 is unselectable when the uppermost part of the list is displayed in the held job list 401, and a lower arrow button 406 is unselectable when the lowermost part thereof is displayed. Upon the upper arrow button 405 being selected when in a selectable state, the previous page of the page that is currently displayed in the held job list 401 is displayed. Upon the lower arrow button 406 being selected, the next page of the page that is currently displayed in the held job list 401 is displayed.

An end button 407 is for ending the paper information replacement mode. Upon an instruction to the end button 407 being received, the cassette information of the virtual paper cassettes that is temporarily recorded in the virtual paper cassette list 408 is discarded. After the discarding, the display transitions to the job holding screen in FIG. 3A. At the time of the transition, the checked state in the held job list 401 is reflected in the held job list 301 in the job holding screen in FIG. 3A.

The virtual paper cassette list 408 is a second paper cassette list created by copying a cassette list of the paper cassettes 109 provided in the image forming apparatus and a list of information of paper that is set in each cassette. This virtual paper cassette list 408 is stored in an area that is different from that of a first paper cassette list in the RAM 102. The initial state of the virtual paper cassette list 408 is the state of the list of paper in the actual paper cassettes 109 at the time of transitioning to the paper information replacement mode screen in FIG. 5A. Note that even if paper information that is set for the virtual paper cassettes is replaced here, the paper in the actual paper cassettes does not change.

Each row in the virtual paper cassette list 408 indicates a virtual paper cassette that is created in association with a cassette provided in the image forming apparatus, and displays the size and the name of the paper that is set for the virtual paper cassette. Each row is a button for causing the corresponding virtual paper cassette to enter the selected state. This button is selectable when there is a virtual paper cassette corresponding to each row, and a row that does not correspond to any virtual paper cassette cannot be selected. The selected state of a virtual paper cassette is a state for selecting a virtual paper cassette to display/change the details thereof using a later-described paper change button 409. A row corresponding to a selected virtual paper cassette is displayed with a color that is different from that of other rows. There is no case where a plurality of virtual paper cassettes are simultaneously in the selected state, and if a row corresponding to a virtual paper cassette is selected in a state where another virtual paper cassette is already in the selected state, the newly-selected virtual paper cassette enters the selected state. Meanwhile, the selected state of the virtual paper cassette that was formerly in the selected state is cancelled. In the case of selecting a button of a row corresponding to a virtual paper cassette that is already in the selected state, the selected state of the virtual paper cassette is cancelled.

The paper change button 409 is selectable when any of the rows in the virtual paper cassette list 408 is selected and the corresponding virtual paper cassette is in the selected state. Upon the paper change button 409 being selected, the display transitions to a later-described virtual paper cassette paper change screen in FIG. 5B. Upon paper information being selected on the virtual paper cassette paper change screen in FIG. 5B, the paper information of the corresponding virtual paper cassette is temporarily changed to the selected paper information, and the display of the virtual paper cassette list 408 is updated.

The paper detail button 410 is selectable when any of the rows in the virtual paper cassette list 408 is selected and the corresponding virtual paper cassette is in the selected state. Upon the paper detail button 410 being selected, the display transitions to a paper detail screen (not shown). The paper detail screen displays detail information of paper that is set for a virtual paper cassette in the selected state when the paper detail button 410 is selected.

An undo button 411 is selectable if the virtual paper cassette list 408 has been changed from its initial state. The initial state of the virtual paper cassette list 408 is the state of the actual paper cassettes 109, as described above. Upon the undo button 411 being selected, the paper information of the virtual paper cassettes that has been temporarily changed is restored to the initial state, and the virtual paper cassette list 408 is updated. Virtual paper cassette list arrow buttons 412 and 413 are buttons for giving instructions to scroll the virtual paper cassette list 408. An upper arrow button 412 is unselectable when the uppermost part of the list is displayed in the virtual paper cassette list 408, and a lower arrow button 409 is unselectable when the lowermost part thereof is displayed. Upon the upper arrow button 412 being selected when in a selectable state, the previous page of the page that is currently displayed in the virtual paper cassette list 408 is displayed. Upon the lower arrow button 413 being selected, the next page of the page that is currently displayed in the virtual paper cassette list 408 is displayed. A collectively apply button 414 is selectable if the virtual paper cassette list 408 has been changed from its initial state. Upon the collectively apply button 414 being selected, the paper information of the virtual paper cassettes is applied to the paper information of the actual paper cassettes, and the display transitions to a later-described paper replacement screen in FIG. 5C.

FIG. 5B shows an exemplary screen for changing paper information of the virtual paper cassettes.

This virtual paper cassette paper change screen is a screen for changing the type of paper that is set for each virtual paper cassette. The virtual paper cassette to be a target of the change is a virtual paper cassette that is in the selected state in the virtual paper cassette list 408 when the paper change button 409 was selected on the paper information replacement mode screen in FIG. 5A.

A paper type list sort button 421 is for rearranging the display order of the paper types to be displayed in a later-described paper type list 422. Upon the paper type list sort button 421 being selected, a pull-down menu (not shown) is displayed. This pull-down menu contains items such as display in "registration order" and display in "name order". Upon the sorting method being selected from the pull-down menu, the order in the paper type list is changed to the selected one, and the display of the paper type list 422 is updated. In FIG. 5B, "registration order" is selected.

The paper type list 422 is a list of paper types registered in the image forming apparatus. Each row corresponds to a paper type, and displays the name, the weight, and the size of the paper. Each row is a button for causing the corresponding paper type to enter the selected state. The button is selectable when there is a paper type corresponding to the row, and cannot be selected in the case where only a few paper types are registered and no paper type corresponds to the row. The selected state of a paper type is a state for selecting the paper type to display the details thereof using a later-described detail button 425, or for setting the paper type for virtual paper cassette using an OK button 427. A row corresponding to a selected paper type is displayed with a color that is different from that of other rows. There is no case where a plurality of paper types are simultaneously in the selected state, and if a row corresponding to a paper type is selected in a state where another paper type is already in the selected state, the newly-selected paper type enters the selected state, and the selected state of the paper type that was formerly in the selected state is cancelled. In the case of selecting a button of a row corresponding to a paper type that is already in the selected state, the selected state of this paper type is cancelled.

Paper type list arrow buttons 423 and 424 are buttons for giving instructions to scroll the paper type list 422. An upper arrow button 423 is unselectable when the uppermost part of the list is displayed in the paper type list 424, and a lower arrow button 424 is unselectable when the lowermost part thereof is displayed. Upon the upper arrow button 423 being selected when in a selectable state, the previous page of the page that is currently displayed in the paper type list 422 is displayed. Upon the lower arrow button 424 being selected, the next page of the page that is currently displayed in the paper type list 422 is displayed.

The detail button 425 is selectable when any of the rows in the paper type list 422 is selected and the corresponding paper type is in the selected state. Upon the detail button 425 being selected, a paper type edit screen (not shown) is displayed. A cancel button 426 is for cancelling and ending the paper type selection on this screen. If selection of the cancel button 426 is received, the display transitions to a pre-transition screen. At this time, the selected state of the paper type in the paper type list 422 that has been in the selected state is cancelled. An OK button 427 is for ending paper setting processing. The OK button 427 is selectable when any of the paper types in the paper type list 422 is in the selected state. If an instruction to the OK button 427 is received, the paper type in the selected state is determined as the paper information to be set for the virtual paper cassette, and is registered for the virtual paper cassette selected in FIG. 5A.

FIG. 5C is a diagram showing an exemplary collective paper setting screen. The display transitions to this collective paper setting screen if the virtual paper cassette list 408 is changed from its initial state on the paper information replacement mode screen in FIG. 5A, and is a screen for giving a request to replace paper for the paper cassette whose paper information has been changed. The collective paper setting screen in FIG. 5C is displayed sequentially as many times as the number of virtual paper cassettes whose paper information has been changed. The details will be described later with reference to a flowchart.

A requested paper display 431 is a section for displaying paper information that is set for the virtual paper cassette on the paper information replacement mode screen in FIG. 5A. The items displayed here include the size and the name of paper. The operator sets the paper information displayed in the requested paper display 431 for the paper cassette indicated in a later-described paper cassette list 432.

The paper cassette list 432 is a list of the paper cassettes in the image forming apparatus and the paper information that is set for the paper cassettes. Each row corresponds to a paper cassette, and displays the paper size, the paper name, and an icon 440 indicating whether or not to set paper by collective paper setting processing. In the collective paper setting screen in FIG. 5C, a row corresponding to the paper cassette that is a paper setting target is displayed with a different color. The icon 440 indicating whether or not to set paper is displayed if paper setting is requested during a series of paper setting processing. Initially, the icon 440 is displayed for all paper cassettes that have been changed from their initial state in the virtual paper cassette list 408 on the paper information replacement mode screen in FIG. 5A. This icon is not displayed in a row corresponding to a paper cassette for which paper setting has already been finished during the series of paper setting processing. A detail button 433 is a button for displaying a detail screen regarding the paper type displayed in the requested paper display 431. Upon the detail button 433 being selected, the display transitions to a paper detail screen (not shown).

Paper cassette list arrow buttons 434 and 435 are buttons for giving instructions to scroll the paper cassette list 434. An upper arrow button 434 is unselectable when the uppermost part of the list is displayed in the paper cassette list 432, and a lower arrow button 435 is unselectable when the lowermost part thereof is displayed. Upon the upper arrow button 434 being selected when in a selectable state, the previous page of the page that is currently displayed in the paper cassette list 433 is displayed. Upon the lower arrow button 435 being selected, the next page of the page that is currently displayed in the paper cassette list 433 is displayed. A stop button 436 is for stopping and ending collective paper setting. If the stop button 436 is selected, paper setting for the paper cassette is not performed. If the stop button 436 is selected, the paper information of the virtual paper cassettes recorded on the paper information replacement mode screen in FIG. 5A is discarded, and the display transitions to the job holding screen in FIG. 3A. An OK button 437 is a button to be selected by the operator in order to notify the apparatus that paper has been set, and when selected, processing for the next paper cassette is then performed. The details will be described later with reference to a flowchart. Upon the OK button 437 being selected, requested paper (i.e., the paper displayed as the requested paper display 431) is registered as the paper information of the paper cassette at this time. Upon completing the setting of the paper information for all paper cassettes corresponding to the virtual paper cassettes that have been changed from their initial state on the paper information replacement mode screen in FIG. 5A, the paper information of the virtual paper cassettes recorded on the paper information replacement mode screen in FIG. 5A is discarded. Then the display transitions to the job holding screen in FIG. 3A, and collective paper setting processing ends.

In FIG. 5C, a request is given to the operator so as to set A4-size paper having the name "paper2" in the paper cassette corresponding to a row 441.

Figure 6:
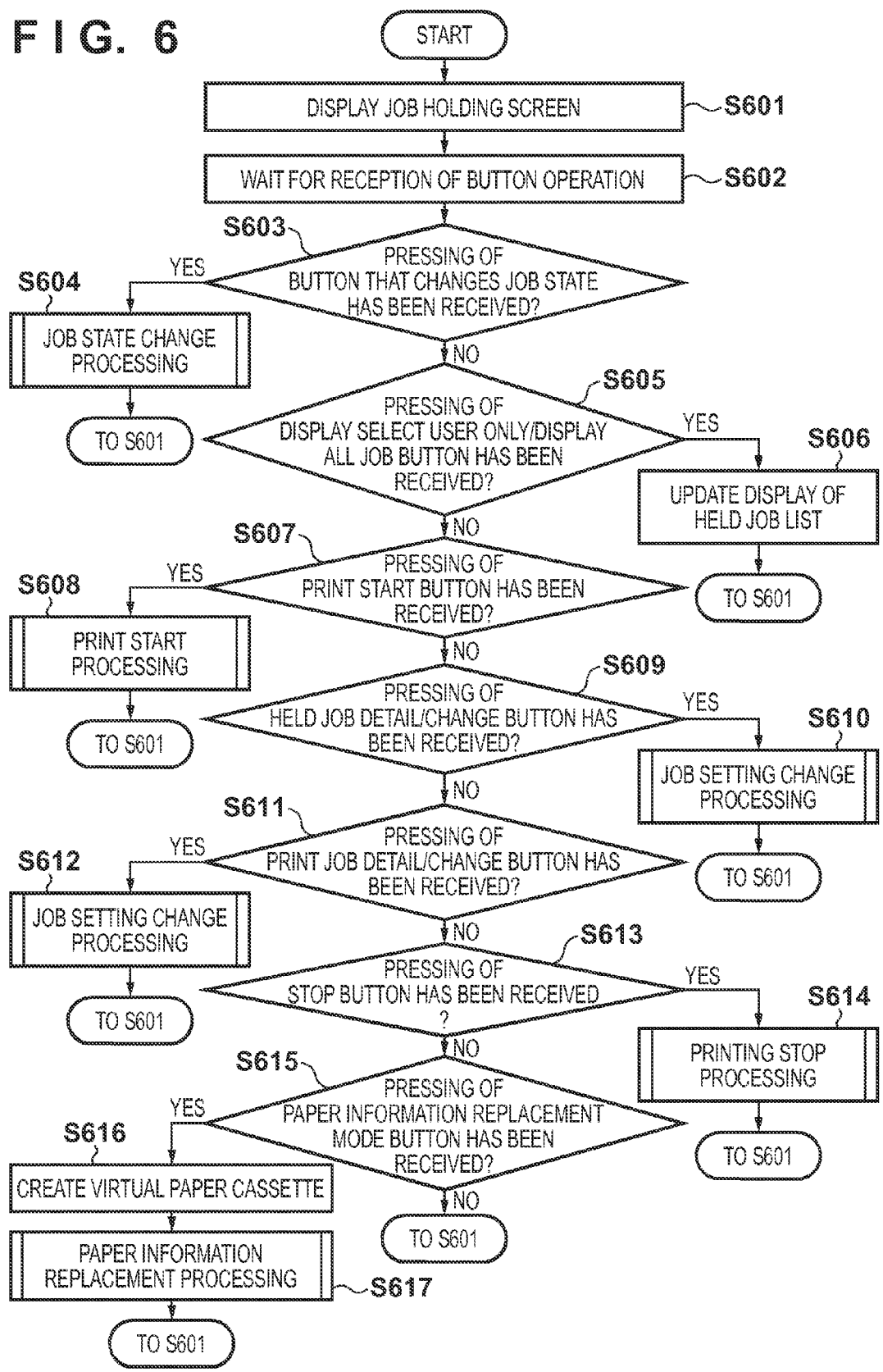
FIG. 6 is a flowchart illustrating control processing performed by the image forming apparatus according to the present embodiment.

FIG. 6 is a flowchart illustrating control processing performed by the image forming apparatus according to the present embodiment. This processing is started by a request to use the job holding function being received from the operator. Note that a program for executing this processing is installed in the HDD 104, and the processing is realized by the CPU 101 deploying the program in the RAM 102 and executing the program, using the boot program stored in the ROM 103.

Initially, in step S601, the CPU 101 displays the job holding screen in FIG. 3A on the operation unit 121, and proceeds to step S602. In step S602, the CPU 101 waits until the operation unit 121 receives the operation by the operator, and proceeds to step S603 upon receiving the operation. In step S603, the CPU 101 determines whether or not the operation received in step S602 is an operation of pressing a button related to a job status change, and if so, the CPU 101 proceeds to step S604. In step S604, the CPU 101 performs job status change processing in accordance with the operation received in step S602 and the job status, and proceeds to step S601. Note that the details of the processing in step S604 will be described later with reference to a flowchart in FIG. 7. The details of the buttons related to a job status change are as described above with reference to FIGS. 3A to 3D.

On the other hand, if the CPU 101 determines in step S603 that the received operation is not an operation to a button related to a job status change, the CPU 101 proceeds to step S605. In step S605, the CPU 101 determines whether or not the operation received in step S602 is an operation of pressing the display select user only/display all job button 304. If so, the CPU 101 proceeds to step S606, and if not, the CPU 101 proceeds to step S607. In step S606, the CPU 101 updates the content of the held job list displayed on the operation unit 121. The processing at this time is as described above in detail with reference to FIG. 3A. After thus updating the content of the held job list, the CPU 101 proceeds to step S601.

In step S607, the CPU 101 determines whether or not the operation received in step S602 is an operation of pressing the print start button 308. If so, the CPU 101 proceeds to step S608, and if not, the CPU 101 proceeds to step S609. In step S608, the CPU 101 starts printing of the held job selected in the held job list 301, and proceeds to step S601.

In step S609, the CPU 101 determines whether or not the operation received in step S602 is an operation of pressing the held job detail/change button 302. If so, the CPU 101 proceeds to step S610, and if not, the CPU 101 proceeds to step S611. In step S610, the CPU 101 displays the job setting edit screen in FIG. 3B on the operation unit 121, and performs job setting change processing for receiving an operation of changing job settings by the operator. The processing at this time is as described above with reference to FIG. 3B. Upon receiving a change of job settings or cancellation here, the CPU 101 proceeds to step S601.

In step S611, the CPU 101 determines whether or not the operation received in step S602 is an operation of pressing the print job detail/change button 310. If so, the CPU 101 proceeds to step S612, and if not, the CPU 101 proceeds to step S613. In step S612, the CPU 101 performs job setting change processing for receiving an operation of changing job settings by the operator. The screen displayed on the operation unit 121 at this time is almost the same as the job setting edit screen in FIG. 3B, and a description thereof will be omitted accordingly. The content of the processing at this time is also the same as that described above with reference to FIG. 3B. Upon receiving a change of job settings or cancellation in step S612, the CPU 101 proceeds to step S601.

In step S613, the CPU 101 determines whether or not the operation received in step S602 is an operation of pressing the print stop button 311. If so, the CPU 101 proceeds to step S614, and if not, the CPU 101 proceeds to step S615. In step S614, the CPU 101 performs printing stop processing. After thus ending printing start processing, the CPU 101 proceeds to step S601.

In step S615, the CPU 101 determines whether or not the operation received in step S602 is an operation of pressing the paper information replacement mode button 305. If so, the CPU 101 proceeds to step S616, and if not, the CPU 101 proceeds to step S601. In step S616, the CPU 101 creates virtual paper cassettes in the RAM 102. The paper information of the paper cassettes 109 is stored as initial values of the virtual paper cassettes created here. Next, the CPU 101 proceeds to step S617, displays the paper information replacement mode screen in FIG. 5A on the operation unit 121, and performs paper information replacement processing for receiving an operation in the paper information replacement mode by the operator. The processing at this time is as described above with reference to FIG. 5A. If, in step S617, the CPU 101 ends collective paper information replacement processing in the paper information replacement mode or receives cancellation, the CPU 101 proceeds to step S601.

Figure 7:
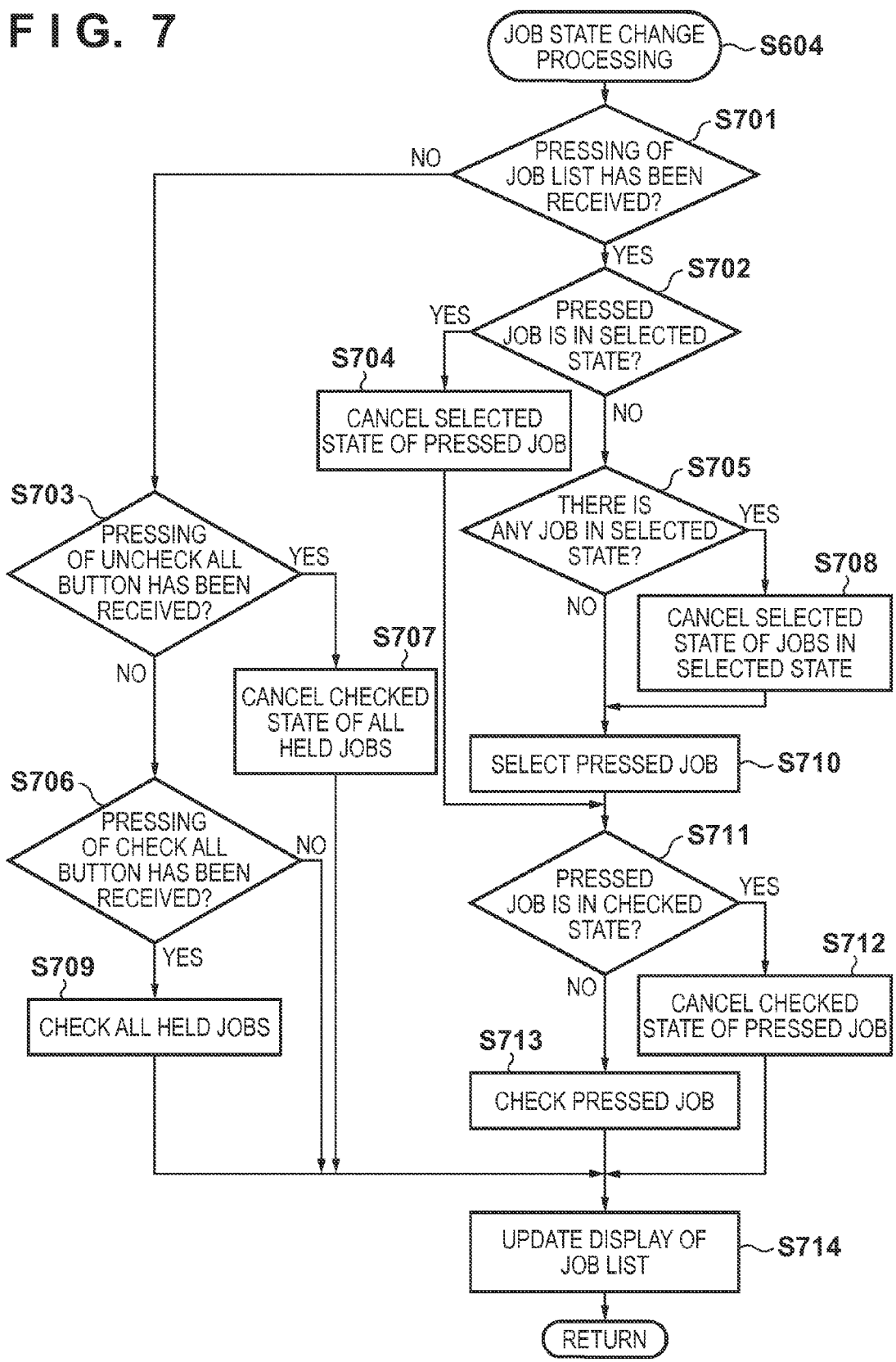
FIG. 7 is a flowchart illustrating job status change processing in step S604 in FIG. 6.

FIG. 7 is a flowchart illustrating job status change processing in step S604 in FIG. 6.

Initially, in step S701, the CPU 101 determines whether or not the operation received in step S602 is an operation of pressing a button for selecting a row corresponding to a job in the held job list 301. If so, the CPU 101 proceeds to step S702, and if not, the CPU 101 proceeds to step S703. In step S702, the CPU 101 determines whether or not the operation of pressing a button for selecting a row in the held job list 301 received in step S602 is an operation of selecting a job (row) that is already in the selected state. If so, the CPU 101 proceeds to step S704, and if not, the CPU 101 proceeds to step S705. In step S704, the CPU 101 cancels the selected state of the row (job) in the held job list 301 received in step S602, and proceeds to step S711. In step S705, the CPU 101 determines whether or not there is a job that is already in the selected state in the held job list 301. If so, the CPU 101 proceeds to step S708, and if not, the CPU 101 proceeds to step S710. In step S708, the CPU 101 cancels the selected state of the job that is already in the selected state according to the determination in step S705, and proceeds to step S710. In step S710, the CPU 101 changes the status of the job corresponding to the row in the held job list 301 received in step S602 to the selected state, and proceeds to step S711.

In step S711, the CPU 101 determines whether or not the operation of pressing a button for selecting a row corresponding to a job in the held job list 301 received in step S602 is an operation for a job that is already in the checked state. If so, the CPU 101 proceeds to step S712, and if not, the CPU 101 proceeds to step S713. In step S712, the CPU 101 cancels the checked state of the job indicated by the operation to the held job list 301 received in step S602, and proceeds to step S714. In step S713, the CPU 101 changes the status of the job corresponding to the row in the held job list 301 received in step S602 to the checked state, and proceeds to step S714.

On the other hand, if, in step S701, the received operation is not an operation of selecting a row corresponding to a job in the held job list 301, the CPU 101 proceeds to step S703 and determines whether or not the operation received in step S602 is an operation of pressing the uncheck all button 303. If so, the CPU 101 proceeds to step S707, and if not, the CPU 101 proceeds to step S706. In step S707, the CPU 101 cancels the checked state of all jobs in the held job list 301, and proceeds to step S714.

On the other hand, in step S706, the CPU 101 determines whether or not the operation received in step S602 is an operation of pressing the check all button 303. If so, the CPU 101 proceeds to step S709, and if not, the CPU 101 proceeds to step S714. In step S709, the CPU 101 changes the status of all jobs in the held job list 301 to the checked state, and proceeds to step S714. In step S714, since the status of the jobs in the held job list 301 in FIG. 3A has been changed, the CPU 101 displays the held job list 401 in FIG. 5A on the operation unit 121. After the updating of the held jobs thus ends, this job status change processing ends.

Figure 8:
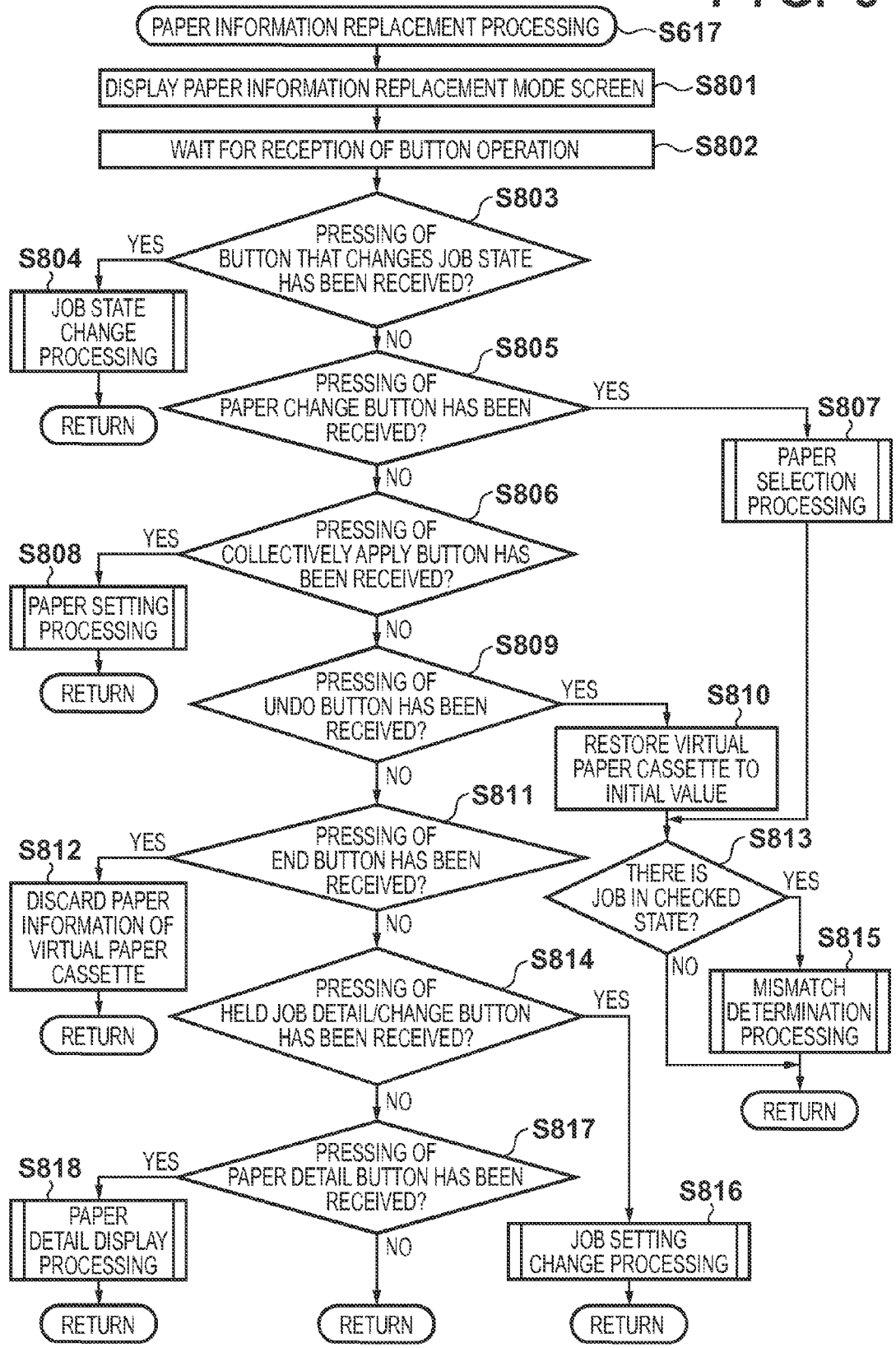
FIG. 8 is a flowchart illustrating paper information replacement processing in step S617 in FIG. 6.

FIG. 8 is a flowchart illustrating paper information replacement processing in step S617 in FIG. 6.

Initially, in step S801, the CPU 101 displays the paper information replacement mode screen in FIG. 5A on the display unit of the operation unit 121, and proceeds to step S802. Note that the initial state of the virtual paper cassettes here is the state held in the RAM 102 in step S616 in FIG. 6. In step S802, the CPU 101 waits until the operation unit 121 receives an operation from the operator, and proceeds to step S803 upon receiving the operation. In step S803, the CPU 101 determines whether or not the operation received in step S602 is an operation of pressing a button related to a status change of a held job. If so, the CPU 101 proceeds to step S804, and if not, the CPU 101 proceeds to step S805. The details of the buttons related to a job status change are as described above with reference to FIGS. 5A to 5C. In step S804, the CPU 101 performs job status change processing in accordance with the operation received in step S802 and the job status at this time. The content of the details of this processing is the same as that described with the flowchart in FIG. 7. After the job status change processing in step S804 thus ends, this processing ends.

In step S805, the CPU 101 determines whether or not the operation received in step S802 is an operation of pressing the paper change button 409. If so, the CPU 101 proceeds to step S807, and if not, the CPU 101 proceeds to step S806. In step S807, the CPU 101 displays the paper setting screen in FIG. 5B on the display unit of the operation unit 121, performs processing for receiving paper setting selection by the operator, and then proceeds to step S813.

In step S806, the CPU 101 determines whether or not the operation received in step S802 is an operation of pressing the collectively apply button 414. If so, the CPU 101 proceeds to step S808, and if not, the CPU 101 proceeds to step S809. In step S808, the CPU 101 displays the paper setting screen in FIG. 5C on the operation unit 121, and performs paper setting processing for receiving setting (loading) of paper in the paper cassettes by the operator. The content of the processing at this time is as described with reference to FIG. 5C. The processing flow will be described later with reference to a flowchart in FIG. 10. After the paper setting ends or cancellation is received in step S808, this processing ends.

In step S809, the CPU 101 determines whether or not the operation received in step S802 is an operation of pressing the undo button 411. If so, the CPU 101 proceeds to step S810, and if not, the CPU 101 proceeds to step S811. In step S810, the CPU 101 discards the temporarily recorded paper information of the virtual paper cassettes, restores the initial state held in the RAM 102 in step S616, and proceeds to step S813. In step S813, the CPU 101 determines, based on the job status temporarily stored in the RAM 102, whether or not there is a job in the checked state. If so, the CPU 101 proceeds to step S815, and if not, the CPU 101 ends this processing. In step S815, the CPU 101 performs media mismatch determination processing based on the paper information of the virtual paper cassettes. The processing at this time will be described later with reference to a flowchart in FIG. 9. After the media mismatch determination processing end, this processing ends.

On the other hand, if the CPU 101 determines in step S809 that the received operation is not an operation of pressing the undo button 411, the CPU 101 proceeds to step S811 and determines whether or not the operation received in step S802 is an operation of pressing the end button 407. If so, the CPU 101 proceeds to step S812, and if not, the CPU 101 proceeds to step S814. In step S812, the CPU 101 discards the paper information of the virtual paper cassettes stored in the RAM 102, and ends this processing.

In step S814, the CPU 101 determines whether or not the operation received in step S802 is an operation of pressing the held job detail/change button 402. If so, the CPU 101 proceeds to step S816, and if not, the CPU 101 proceeds to step S817. In step S816, the CPU 101 displays the job setting edit screen in FIG. 3B on the operation unit 121, and performs processing for changing job settings by the operator. The processing at this time is as described above in detail with reference to FIG. 3B. After the job setting change in step S816 ends or cancellation is received, this processing ends.

In step S817, the CPU 101 determines whether or not the operation received in step S802 is an operation of pressing the paper detail button 410. If so, the CPU 101 proceeds to step S818, and if not, the CPU 101 proceeds to step S801. In step S818, the CPU 101 performs paper detail display processing (not shown) on the operation unit 121, and the paper details are checked by the operator. After the detail check thus ends and input for ending the paper detail display is received from the operator, this processing ends.

Figure 9:
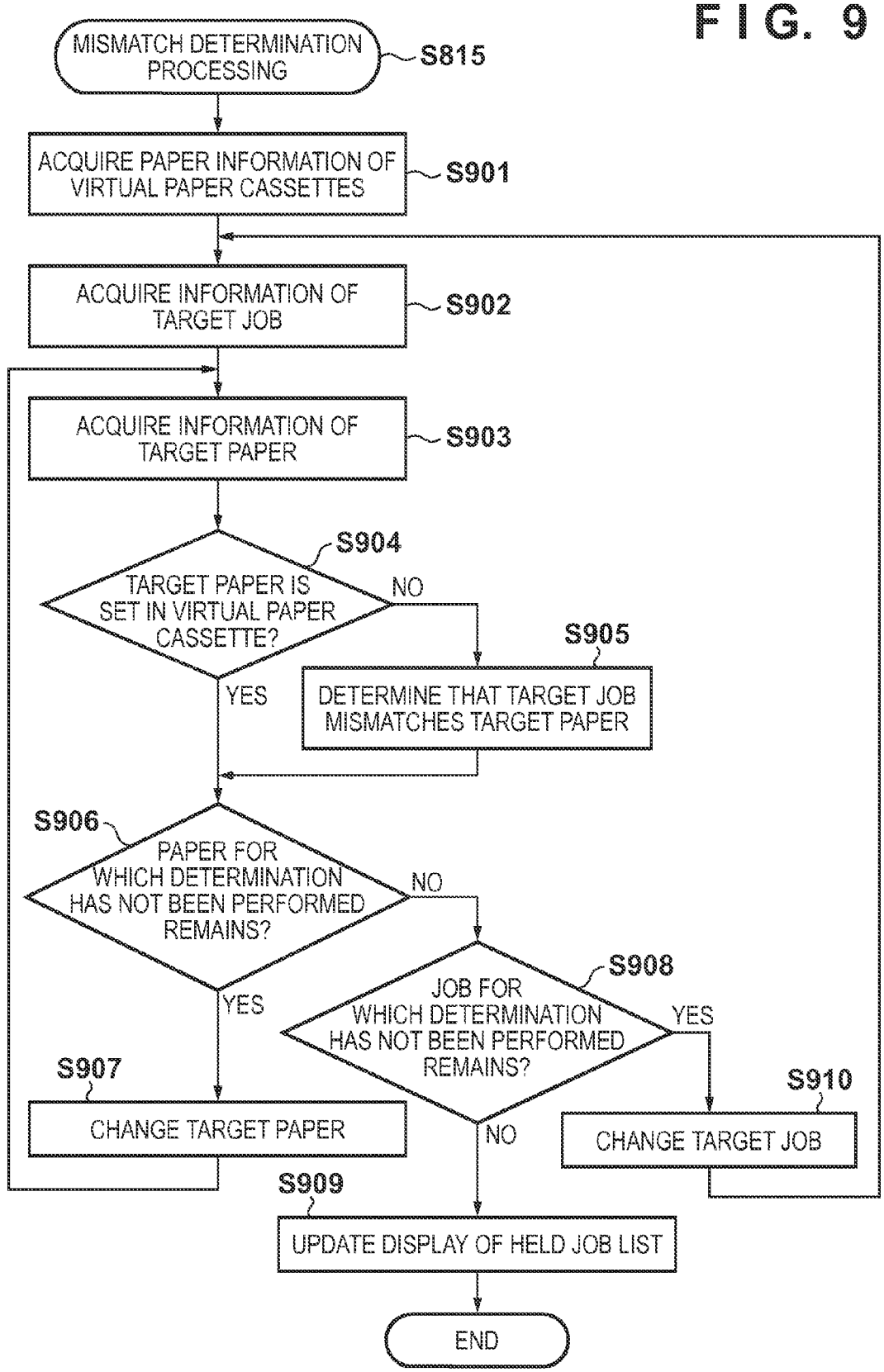
FIG. 9 is a flowchart illustrating mismatch determination processing in step S815 in FIG. 8.

FIG. 9 is a flowchart illustrating the mismatch determination processing in step S815 in FIG. 8. This processing is started by a request to change the paper information of the virtual paper cassettes being received from the operator, in a state where there is a job in the checked state.

Initially, in step S901, the CPU 101 acquires the paper information of the virtual paper cassettes that is temporarily stored in the RAM 102. The information acquired here contains at least information for specifying the types of paper that is set in the virtual paper cassettes. After the paper information of the virtual paper cassettes is acquired, the CPU 101 proceeds to step S902. In step S902, the CPU 101 reads out, into the RAM 102, information of a current mismatch determination target job stored in the HDD 104, and acquires the information of this held print job. The print job to be the target here is a job in the checked state, and the check order here is the order in which the jobs are checked. The print job information to be acquired contains at least information for specifying the types of paper to be used in the print job. After the paper information of the mismatch determination target print job is thus acquired, the CPU 101 proceeds to step S903. In step S903, the CPU 101 acquires information of the paper to be the current mismatch determination target, from the job information acquired in step S902. The determination order here is the order in which paper is used in the job. The paper information to be acquired contains at least information for specifying the type of mismatch determination target paper. After the current mismatch determination target paper information is acquired, the CPU 101 proceeds to step S904.

In step S904, the CPU 101 compares the paper information of the virtual paper cassettes acquired in step S901 with the paper information of the mismatch determination target job acquired in step S903, and determines whether or not the paper to be used in this job is set for the virtual paper cassettes. If the paper is not set according to this determination, the CPU 101 proceeds to step S905, and if the paper is set, the CPU 101 proceeds to step S906. In step S905, the CPU 101 determines that the current target paper of the target job in step S904 is a mismatch, stores this determination result in the RAM 102, and proceeds to step S906.

In step S906, the CPU 101 checks whether or not paper remains for which the mismatch determination has not been performed regarding the current mismatch determination target job. If paper regarding which the determination has not been performed remains, the CPU 101 proceeds to step S907, and if not, the CPU 101 proceeds to step S908. In step S907, the CPU 101 changes the target paper for the mismatch determination target job from the current paper to the next paper to be used in this job, and proceeds to step S903.

If the CPU 101 determines in step S906 that no paper remains for which the determination has not been performed, the CPU 101 proceeds to step S908 and determines whether or not a job remains for which the mismatch determination has not been performed among the mismatch determination target jobs. If a job for which the determination has not been performed remains, the CPU 101 proceeds to step S910, changes the job for which the mismatch determination is performed from the current job to the next job, and proceeds to step S902. After the CPU 101 thus performs the determination of whether or not a media mismatch exists on all target jobs, the CPU 101 proceeds to step S909 and updates the display of the held job list 401 using the mismatch determination result stored in the RAM 102. As to the displayed content updated here, the icon indicating a media mismatch is displayed for a job regarding which a media mismatch has been determined, as described with reference to FIG. 5A. After the updating of the display thus ends, the media mismatch determination flowchart ends.

Figure 10:
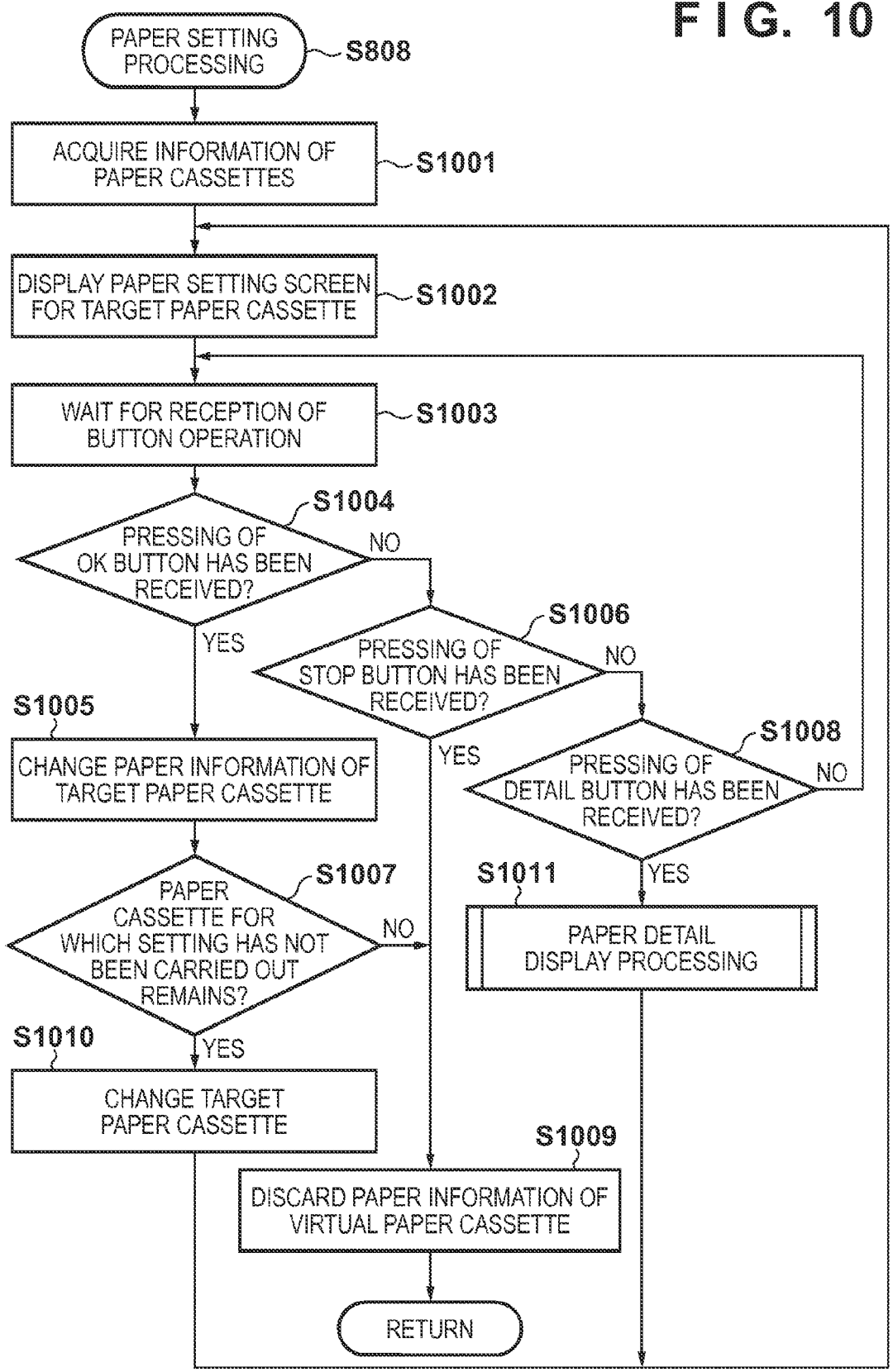
FIG. 10 is a flowchart illustrating paper setting processing in step S808 in FIG. 8.

FIG. 10 is a flowchart illustrating paper setting processing in step S808 in FIG. 8. This processing is started by the operator pressing the collectively apply button 414 and giving a request to collectively apply the paper information of the virtual paper cassettes to the paper cassettes 109, in a state where the virtual paper cassettes have been changed from their initial state.

Initially, in step S1001, the CPU 101 acquires the paper information of the paper cassettes 109 stored in the RAM 102, and proceeds to step S1002. The information acquired here contains at least information for specifying the types of paper that is set in the paper cassettes 109. In step S1002, the CPU 101 displays the paper setting screen (FIG. 5C) for a paper cassette that is the current paper setting target, on the display unit of the operation unit 121, and proceeds to step S1003.

This setting target paper cassette is the paper cassette corresponding to the virtual paper cassette whose paper information has been changed from its initial state. Note that the order in which the current paper setting processing here is performed is the numerical order of the paper cassettes. In step S1003, the CPU 101 waits until the operation unit 121 receives an operation from the operator in a state where the screen in FIG. 5C is displayed, and upon receiving the operation, the CPU 101 proceeds to step S1004.

In step S1004, the CPU 101 determines whether or not the operation received in step S1003 is an operation of pressing the OK button 437. If so, the CPU 101 proceeds to step S1005, and if not, the CPU 101 proceeds to step S1006. In this case, the operator sets designated paper in an indicated paper cassette in accordance with the content displayed on the screen in FIG. 5C. For example, in the example in FIG. 5C, A4-size paper "paper2" is set in a paper cassette (2). After the setting of the A4-size paper "paper2" in the paper cassette (2) is thus finished, the operator presses the OK button 437. The CPU 101 thereby proceeds to step S1005.

In step S1005, the CPU 101 changes the paper information of the current paper setting target paper cassette to the paper information of the corresponding virtual paper cassette, and proceeds to step S1007. In step S1007, the CPU 101 determines whether or not a paper cassette remains for which the setting processing has not been performed. If so, the CPU 101 proceeds to step S1010, and if not, the CPU 101 proceeds to step S1009. In step S1010, the CPU 101 changes the paper setting target paper cassette from the current paper cassette to the next paper cassette, e.g., changes from the paper cassette (2) to a paper cassette (3) in the example in FIG. 5C, and proceeds to step S1002. In step S1009, since the CPU 101 has updated the paper information of the actual paper cassettes in accordance with the paper information of the virtual paper cassettes, the CPU 101 discards the paper information of the virtual paper cassettes stored in the RAM 102, and ends this flowchart.

In step S1006, the CPU 101 determines whether or not the operation received in step S1003 is an operation of pressing the stop button 436. If so, the CPU 101 proceeds to aforementioned step S1009, discards the paper information of the virtual paper cassettes stored in the RAM 102, and ends this processing. If, in step S1006, the received operation is not an operation of pressing the stop button 436, the CPU 101 proceeds to step S1008, determines whether or not the operation received in step S1003 is an operation of pressing the detail button 433. If so, the CPU 101 proceeds to step S1011, and if not, the CPU 101 proceeds to step S1003. In step S1011, the CPU 101 displays a paper detail display screen (not shown) in the operation unit 121. The paper to be the detail display target is paper that is set in the current paper setting target paper cassette. After the operator finishes checking the paper detail display on this paper detail display screen and input for ending the paper detail display is received, the CPU 101 proceeds to step S1002.

As described above, with the image forming apparatus according to Embodiment 1, it is determined whether or not necessary paper for a print job is set in the paper cassettes, and if not, the state where the paper is not set can be displayed. Specifically, the virtual paper cassettes for holding, as their initial state, the paper information of the current paper cassettes 109 are created, and the paper information of the virtual paper cassettes can be changed by the operator. If the paper information of the virtual paper cassettes is changed, it is determined, based on the paper information of the virtual paper cassettes, whether or not the necessary paper for the print job is set, and if not, the state where the paper is not set is displayed.

It is thereby possible to check whether or not necessary paper for executing a job is set, without replacing the paper in the paper cassettes. The paper that is actually set in the paper cassettes is not changed even if the paper information of the virtual paper cassettes is replaced, and therefore, if the operator cannot achieve a desired result, the operation can be ended in the middle, or the paper information can also be restored to its initial value using the undo button.

If the paper information of the virtual paper cassettes is as intended by the operator, the paper information of the virtual paper cassettes can be collectively set as the paper information of the actual paper cassettes, using the collectively apply button 414. When physically setting paper in the paper cassettes, the operator need only follow the procedure displayed on the operation unit 121 in accordance with the paper information of the virtual paper cassettes.

According to Embodiment 1, it is possible to reduce the time and effort taken for checking whether or not necessary paper for executing a print job is set in the paper cassettes 109, and the handling of the case where the necessary paper is not set can be facilitated. Moreover, restoration of the paper information of the paper cassettes can be done with a single operation, and the possibility of occurrence of an error at this time can be eliminated. Furthermore, it is also possible to save the time and effort of, for example, doing trial and error for combining paper to be set in the paper cassettes 109 in order to execute a job.

Embodiment 2

In Embodiment 1 described above, if pressing of the stop button 436 is received on the screen in FIG. 5C from the operator during the paper setting processing, the paper setting processing ends in a state while the information of the paper cassette 109 for which paper setting has already been finished remains in a state where the paper is set. In this case, even if the operator notices an error at the time of setting the paper, the paper cassette cannot be restored to its original state.

Furthermore, although the screen in FIG. 5C in Embodiment 1 indicates the procedure by displaying the paper cassette for which paper is to be set and the name of the paper to be set, there is a possibility that the operator sets paper in a paper cassette 109 that is different from the paper cassette displayed on this screen.

For this reason, in Embodiment 2 that will be described below, following processing is performed in addition to the processing in Embodiment 1.

- The CPU 101 presents the paper cassette in which the operator is to set paper, by opening (or withdrawing) the paper cassette in which the paper is to be set.
- If an instruction to stop the paper setting processing is received through the stop button 436 from the operator, the CPU 101 displays processing for restoring the state of the paper cassettes to the previous state before the paper setting processing, on the operation unit 121.

Since the mode in Embodiment 2 is the same as that described in Embodiment 1 except the paper setting processing, a description of the same mode will be omitted.

Figure 11:
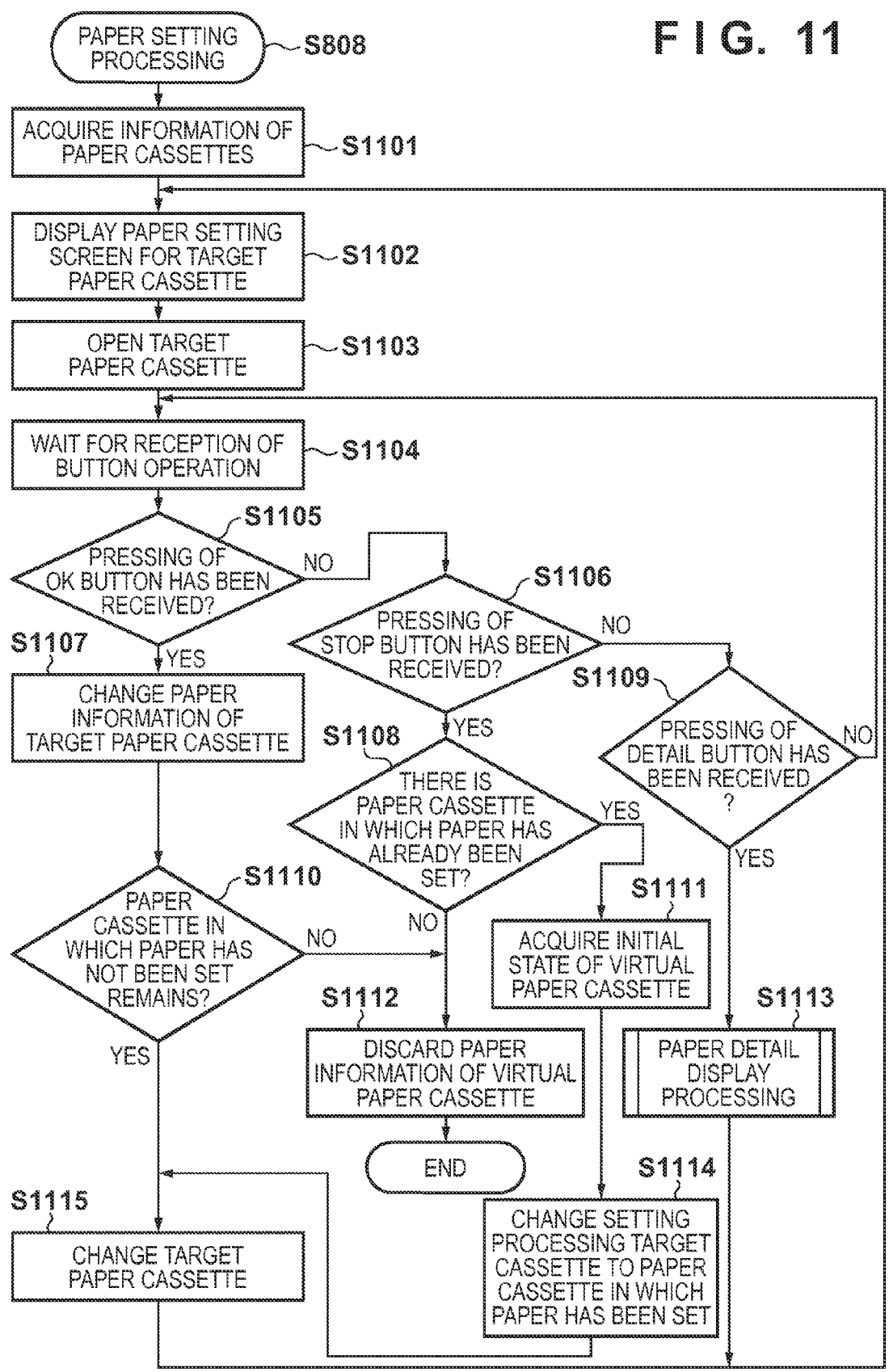
FIG. 11 is another flowchart illustrating paper setting processing in step S808 in FIG. 8.

FIG. 11 is a flowchart illustrating paper setting processing in step S808 in FIG. 8 according to Embodiment 2. This processing is started by a request to collectively apply the paper information of the virtual paper cassettes to the paper information of the paper cassettes being received from the operator, in a state where the virtual paper cassettes have been changed from their initial state.

Initially, in step S1101, the CPU 101 acquires the paper information of the paper cassettes 109 stored in the RAM 102, and proceeds to step S1102. The information acquired here contains at least information for specifying the types of paper that is set in the paper cassettes 109. In step S1102, the CPU 101 displays the paper setting screen (FIG. 5C) for a paper cassette 109 that is the current paper setting target on the display unit of the operation unit 121, and proceeds to step S1103. The paper cassette to be the paper setting target is the paper cassette corresponding to a virtual paper cassette whose paper information has been changed from its initial state. The order in which the current paper setting processing is performed here is the numerical order of the paper cassettes. The details of the paper setting screen are as described with reference to FIG. 5C.

In step S1103, the CPU 101 opens (withdraws) the paper cassette that is the current paper setting target via the paper cassette control unit 108, and proceeds to step S1104. In step S1104, the CPU 101 waits until the operation unit 121 receives an operation from the operator, and proceeds to step S1105 upon receiving the operation. In step S1105, the CPU 101 determines whether or not the operation received in step S1104 is an operation of pressing the OK button 437. If so, the CPU 101 proceeds to step S1107, and if not, the CPU 101 proceeds to step S1106.

At this time, the operator sets the paper having the size and the name designated on the screen in FIG. 5C, in the paper cassette that is opened or withdrawn in step S1103. After the paper setting is finished and the paper cassette is closed or restored from the withdrawn state, the OK button 437 is pressed on the screen in FIG. 5C.

Thus, in step S1105, the CPU 101 receives the pressing of the OK button 437. In step S1107, the CPU 101 changes the paper information of the paper setting target paper cassette to the paper information of the corresponding virtual paper cassette, and proceeds to step S1110. In step S1110, the CPU 101 determines whether or not a paper cassette remains in which paper has not been set. If so, the CPU 101 proceeds to step S1115, and if not, the CPU 101 proceeds to step S1112. In step S1115, the CPU 101 changes the paper setting target paper cassette from the current paper cassette to the next paper cassette 109, and proceeds to step S1102.

On the other hand, if, in step S1105, the received operation is not an operation to the OK button 437, the CPU 101 proceeds to step S1106 and determines whether or not the operation received in step S1104 is an operation of pressing the stop button 436. If so, the CPU 101 proceeds to step S1108, and if not, the CPU 101 proceeds to step S1109. In step S1108, the CPU 101 determines whether or not there is a paper cassette in which paper has already been set. If so, the CPU 101 proceeds to step S1111, and if not, the CPU 101 proceeds to step S1112. In step S1111, the CPU 101 acquires the initial state of the virtual paper cassettes stored in RAM 102, and proceeds to step S1114. In step S1114, the CPU 101 changes the setting processing target paper cassette to a paper cassette in which paper has been set, restores the changed paper information to the initial state of the paper information of the corresponding virtual paper cassette, and proceeds to step S1115. The paper information of the paper cassette that has been changed from the initial state of the virtual paper cassette is thereby restored to the original paper information. At this time, the CPU 101 displays, on the operation unit 121, the screen for restoring the paper in the paper cassette to the previous paper used before the paper setting processing is performed, and prompts the operator to restore the set paper to its initial state. If, in step S1108, there is no paper cassette for which the setting processing has been performed, the CPU 101 proceeds to step S1112, discards the paper information of the virtual paper cassettes stored in the RAM 102, and ends this flowchart.

If, in step S1106, the received operation is not the pressing of the stop button 436, the CPU 101 proceeds to step S1109 and determines whether or not the operation received in step S1104 is an operation of pressing the detail button 433. If so, the CPU 101 proceeds to step S1113, and if not, the CPU 101 proceeds to step S1104. In step S1113, the CPU 101 displays a paper detail display screen (not shown) on the operation unit 121. The paper to be the detail display target here is paper that is set in the current paper setting target paper cassette 109. After the operator finishes checking the paper detail display on the paper detail display screen and input for ending the paper detail display is received, the CPU 101 proceeds to step S1102.

According to Embodiment 2 described above, in the case of applying the paper information of the virtual paper cassettes to the paper information of the actual paper cassettes, the operator can press the stop button 436 for cancelling the paper setting. Thus, the changed paper information of the paper cassettes can be restored to the original paper information. At this time, the CPU 101 displays, on the operation unit 121, the screen for restoring the paper in the paper cassettes to the previous paper used before the paper setting processing is performed. Thus, even if the operator cancels the paper setting in the middle, the operator will not make an operation error if he/she follows the procedure displayed on the operation unit 121, and can restore the paper in the paper cassettes to the original paper.

Furthermore, since the paper cassette in which paper is to be set is opened (withdrawn) by the CPU 101, there is no possibility that the operator sets, by mistake, paper in a paper cassette that is different from the paper cassette displayed on the operation unit 121. Thus, an operation error at the time of setting paper can be reliably prevented.

Embodiment 3

In Embodiments 1 and 2 described above, even while processing for replacing paper information of the virtual paper cassettes is performed, the operator can physically change paper in the paper cassettes. Since the paper in the paper cassettes 109 is not changed even if the paper information of the virtual paper cassettes is replaced, unnecessary paper setting is required if the paper in the paper cassettes 109 is changed while the paper information of the virtual paper cassettes is replaced. Furthermore, if the operator misunderstands that the replacement of the paper information of the virtual paper cassettes performed during the paper information replacement processing is a change of paper in the paper cassettes 109, it may possibly be determined that paper setting is completed, without the paper in the paper cassettes not being changed.

Moreover, in Embodiments 1 and 2 described above, if settings of a job are changed, the result of determination in the mismatch determination processing for this job follows the previous job settings, and the mismatch determination may possibly be different from the actual state. Accordingly, in Embodiment 3 that will be described below, following processing is performed in addition to the processing in Embodiments 1 and 2.

The CPU 101 disables a physical change of paper in the paper cassettes 109 during the paper information replacement processing.

If an instruction to end the paper information replacement processing is given without a transition to the paper setting processing, the CPU 101 displays an alert on the operation unit 121 and notifies the operator that paper in the paper cassettes 109 has not been changed.

If the job settings are changed, the mismatch determination is performed on the job whose settings are changed.

Embodiment 3 is the same as Embodiments 1 and 2 described above except the paper information replacement mode, and a description of the same part will be omitted accordingly.

FIGS. 12A and 12B are flowcharts illustrating the paper information replacement processing in step S617 in FIG. 6 according to Embodiment 3 of the present invention. This processing is started by a request for the paper information replacement processing being received from the operator.

Initially, in step S1201, the CPU 101 acquires information of the paper cassettes 109 via the paper cassette control unit 108, and determines whether or not any of the paper cassettes 109 is open. If there is an opened paper cassette 109, the CPU 101 proceeds to step S1202, and if not, the CPU 101 proceeds to step S1204. In step S1202, the CPU 101 displays, on the operation unit 121, a screen (not shown) indicating that a paper cassette is open. The screen displayed here includes a diagram indicating the cassette number and the position of the opened cassette, and a message such as "Please close the cassette". Next, the CPU 101 proceeds to step S1203 and waits until the paper cassette 109 is closed by the operator. Upon detecting via the paper cassette control unit 108 that the paper cassette 109 is closed, the CPU 101 proceeds to step S1204.

In step S1204, the CPU 101 locks the paper cassettes 109 via the paper cassette control unit 108 such that the operator cannot open the paper cassettes 109, and proceeds to step S1205. The CPU 101 does not accept an instruction to open the paper cassettes 109 from the operator while the paper cassettes 109 are thus locked. In step S1205, the CPU 101 displays the paper information replacement mode screen in FIG. 5A on the display unit of the operation unit 121, and proceeds to step S1206. The details of the paper information replacement mode screen are as described above with reference to FIG. 5A. Note that the initial state of the virtual paper cassettes at this time is that held in the RAM 102 in step S616 in FIG. 6. In step S1206, the CPU 101 waits until the operation unit 121 receives an operation from the operator, and proceeds to step S1207 upon receiving the operation.

In step S1207, the CPU 101 determines whether or not the operation received in step S1206 is an operation of pressing a button related to a job status change. If so, the CPU 101 proceeds to step S1208, and if not, the CPU 101 proceeds to step S1209. The details of the buttons related to a job status change have been described in detail with reference to FIG. 5A. In step S1208, the CPU 101 performs the job status change processing in accordance with the operation received in step S1206 and the job status at this time, and proceeds to step S1201. The details thereof is the same as those described with reference to the flowchart in FIG. 7.

In step S1209, the CPU 101 determines whether or not the operation received in step S1206 is an operation of pressing the paper change button 409. If so, the CPU 101 proceeds to step S1211, and if not, the CPU 101 proceeds to step S1210. In step S1211, the CPU 101 displays the paper selection screen in FIG. 4B on the operation unit 121, and performs paper selection processing for receiving paper selection by the operator. The content of the processing at this time is as described above with reference to FIG. 4B. Upon receiving paper selection or cancellation here, the CPU 101 proceeds to step S1217.

In step S1210, the CPU 101 determines whether or not the operation received in step S1206 is an operation of pressing the collectively apply button 414. If so, the CPU 101 proceeds to step S1212, and if not, the CPU 101 proceeds to step S1213. In step S1212, the CPU 101 unlocks the paper cassettes 109. Next, the CPU 101 proceeds to step S1214, displays the paper setting screen in FIG. 5C on the operation unit 121, performs the paper setting processing for receiving paper setting by the operator, and proceeds to step S1201. The content of the processing at this time is as described with reference to FIG. 5C.

In step S1213, the CPU 101 determines whether or not the operation received in step S1206 is an operation of pressing the undo button 411. If so, the CPU 101 proceeds to step S1215, and if not, the CPU 101 proceeds to step S1216. In step S1215, the CPU 101 sets the paper information of the paper cassettes as initial values of the virtual paper cassettes, and proceeds to step S1217. In step S1217, the CPU 101 determines whether or not there is a job in the checked state, based on the job status that is temporarily stored in the RAM 102. If so, the CPU 101 proceeds to step S1220, executes the mismatch determination processing, and then proceeds to step S1201. The processing at this time is the same as that described with reference to the flowchart in FIG. 9. If the CPU 101 determines in step S1217 that no job is in the checked state, the CPU 101 proceeds to step S1201.

In step S1216, the CPU 101 determines whether or not the operation received in step S1206 is an operation of pressing the end button 407. If so, the CPU 101 proceeds to step S1218, and if not, the CPU 101 proceeds to step S1219. In step S1218, the CPU 101 displays an end check screen (not shown) on the operation unit 121, and proceeds to step S1221. This end check screen includes an alert message indicating that paper in the paper cassettes 109 has not been changed, an OK button, and a cancel button. In step S1221, the CPU 101 waits until the operation unit 121 receives an operation from the operator, and proceeds to step S1224 upon receiving the operation. In step S1224, the CPU 101 determines whether or not the operation received in step S1221 is an operation of pressing the OK button. If so, the CPU 101 proceeds to step S1228, and if not, the CPU 101 proceeds to step S1227. In step S1228, the CPU 101 discards the paper information of the virtual paper cassettes stored in the RAM 102, and ends the paper information replacement processing. In step S1227, the CPU 101 determines whether or not the operation received in step S1221 is an operation of pressing the cancel button. If so, the CPU 101 ends this processing, and if not, the CPU 101 proceeds to step S1221.

On the other hand, if, in step S1216, the received operation is not the pressing of the end button 407, the CPU 101 proceeds to step S1219 and determines whether or not the operation received in step S1206 is an operation of pressing the held job detail/change button 402. If so, the CPU 101 proceeds to step S1222, and if not, the CPU 101 proceeds to step S1223. In step S1222, the CPU 101 displays the job setting edit screen in FIG. 3B on the operation unit 121, performs processing for changing the job settings by the operator. The content of the processing at this time is as described above in detail with reference to FIG. 3B. Upon ending the job setting change or receiving cancellation here, the CPU 101 proceeds to step S1225. In step S1225, the CPU 101 determines whether or not the job whose settings have been changed in step S1222 is in the checked state, based on the job status that is temporarily stored in the RAM 102. If so, the CPU 101 proceeds to step S1229, and if not, the CPU 101 proceeds to step S1201. In step S1229, the CPU 101 performs the media mismatch determination processing based on the paper information of the virtual paper cassettes. Although the processing at this time is the same as that described above with reference to the flowchart in FIG. 9, the target of the media mismatch determination processing at this time is only the job whose settings have been changed in step S1222. After this media mismatch determination processing ends, the CPU 101 proceeds to step S1201.

In step S1223, the CPU 101 determines whether or not the operation received in step S1206 is an operation of pressing the paper detail button 410. If so, the CPU 101 proceeds to step S1226, and if not, the CPU 101 proceeds to step S1201. In step S1226, the CPU 101 performs paper detail display processing (not shown) on the operation unit 121, and the paper details are checked by the operator. After the paper detail check ends and input for ending the paper detail display is received from the operator, the CPU 101 proceeds to step S1201.

As described above, with the image forming apparatus according to Embodiment 3, the operator cannot open the paper cassettes 109 and set paper therein during the paper information replacement processing. For this reason, the paper that is set in the paper cassettes 109 is maintained in the same state as that of the paper information of the paper cassettes. Moreover, if an instruction to end the paper information replacement processing is received without a transition to the paper setting processing, the operator is notified that the paper in the paper cassettes has not been physically changed. Furthermore, if processing for changing job settings is performed, a media mismatch check is executed on the job whose settings have been changed.

With this configuration, an effect of preventing a deviation between the paper information and the paper that is actually set in the paper cassettes can be achieved.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-171705, filed Aug. 21, 2013, which is hereby incorporated by reference herein in its entirety.

What is claimed is:

1. An image forming apparatus comprising:
    a first storing unit configured to store sheet information of sheets contained in a first sheet containing unit and a second sheet containing unit;
    a second storing unit configured to store sheet information that is set for the first sheet containing unit and the second sheet containing unit;
    a determination unit configured to determine, based on the sheet information stored in the second storing unit, whether or not a sheet to be used in a print job is contained in the first sheet containing unit and the second sheet containing unit;
    a changing unit configured to accept a change of the sheet information in the second storing unit and change the sheet information in the second storing unit, in a case where it is determined by the determination unit that the sheet to be used in the print job is not contained in the first sheet containing unit and the second sheet containing unit; and
    a storage control unit configured to change the sheet information in the first storing unit, using the sheet information in the second storing unit that has been changed by the changing unit.

2. The image forming apparatus according to claim 1, further comprising an instruction unit configured to give an instruction to restore the sheet information in the second storing unit that has been changed by the changing unit to the previous sheet information before being changed by the changing unit.

3. The image forming apparatus according to claim 1, further comprising a display unit configured to display information indicating a result of the determination by the determination unit regarding the print job.

4. The image forming apparatus according to claim 1, further comprising a unit configured to display a screen for prompting an operator to set, in accordance with the change of the sheet information in the second storing unit by the changing unit, a relevant sheet in a corresponding sheet containing unit.

5. The image forming apparatus according to claim 1, further comprising a sheet containing unit control unit configured to change, in accordance with the change of the sheet information in the second storing unit by the changing unit, the state of a corresponding sheet containing unit so as to enable a sheet to be set therein.

6. The image forming apparatus according to claim 5, wherein the sheet containing unit control unit changes the state of the corresponding sheet containing unit so as to enable a sheet to be set therein, by opening or withdrawing the corresponding sheet containing unit.

7. The image forming apparatus according to claim 4, further comprising a unit configured to restore the sheet information in the second storing unit to the previous sheet information before being changed by the changing unit, in response to an instruction given by the operator to stop an operation of setting a relevant sheet in the corresponding sheet containing unit in accordance with the change of the sheet information in the second storing unit by the changing unit, and to display a screen for prompting the operator to change a sheet in a sheet containing unit in which the sheet is already set, to a sheet corresponding to the previous sheet information before being changed by the changing unit.

8. The image forming apparatus according to claim 1, further comprising a lock unit configured to perform locking such that a sheet in the sheet containing units cannot be changed when the sheet information in the second storing unit is changed by the changing unit.

9. A method for controlling an image forming apparatus that forms an image on a sheet that is fed from at least one of a first sheet containing unit and a second sheet containing unit, the method comprising:

- a first storing step of storing sheet information of a sheet contained in each of the first sheet containing unit and the second sheet containing unit;
- a second storing step of storing, in a memory, sheet information that is set for the first sheet containing unit and the second sheet containing unit;
- a determination step of determining, based on the sheet information stored in the memory, whether or not a sheet to be used in a print job is contained in the first sheet containing unit and the second sheet containing unit;
- a changing step of accepting a change of the sheet information stored in the memory and change the sheet information stored in the memory, in a case where it is determined in the determination step that the sheet to be used in the print job is not contained in the first sheet containing unit and the second sheet containing unit; and
- a storage control step of changing the sheet information stored in the first storing step, using the sheet information in the memory that has been changed in the changing step.

10. A non-transitory computer-readable storage medium storing a program for controlling an image forming apparatus that forms an image on a sheet that is fed from at least one of a first sheet containing unit and a second sheet containing unit, the program causing a computer to execute:

- a first storing step of storing sheet information of a sheet contained in each of the first sheet containing unit and the second sheet containing unit;
- a second storing step of storing, in a memory, sheet information that is set for the first sheet containing unit and the second sheet containing unit;
- a determination step of determining, based on the sheet information stored in the memory, whether or not a sheet to be used in a print job is contained in the first sheet containing unit and the second sheet containing unit;
- a changing step of accepting a change of the sheet information stored in the memory and change the sheet information stored in the memory, in a case where it is determined in the determination step that the sheet to be used in the print job is not contained in the first sheet containing unit and the second sheet containing unit; and
- a storage control step of changing the sheet information stored in the first storing step, using the sheet information in the memory that has been changed in the changing step.

* * * * *